United States Patent [19]
Watanabe et al.

[11] Patent Number: 5,543,607
[45] Date of Patent: Aug. 6, 1996

[54] SELF CHECK-OUT SYSTEM AND POS SYSTEM

[75] Inventors: Kiyoshi Watanabe, Kanagawa-ken; Yasuhiro Abe, Hadano; Masaho Sakamoto, Hadano; Takeshi Saitou, Hadano; Takayoshi Ishii, Hadano; Yukio Akimoto, Hadano; Hironori Kashiki, Zama; Masao Kato, Hadano, all of Japan

[73] Assignees: Hitachi, Ltd., Tokyo; Hitachi Computer Engineering Co, Ltd., Kanagawa-ken, both of Japan

[21] Appl. No.: 340,380

[22] Filed: Nov. 14, 1994

Related U.S. Application Data

[63] Continuation-in-part of Ser. No. 197,268, Feb. 16, 1991, abandoned.

[30] Foreign Application Priority Data

| Feb. 18, 1993 | [JP] | Japan | 5-029379 |
| Nov. 17, 1993 | [JP] | Japan | 5-288325 |
| Nov. 19, 1993 | [JP] | Japan | 5-290882 |

[51] Int. Cl.$^6$ .................................................. G06K 15/00
[52] U.S. Cl. ............................ 235/383; 235/462; 186/61
[58] Field of Search .................................. 235/383, 462, 235/454, 494; 186/61

[56] References Cited

U.S. PATENT DOCUMENTS 4,676,343  6/1987  Humble et al. ........................ 186/61

(List continued on next page.)

FOREIGN PATENT DOCUMENTS

| 61-128396 | 6/1986 | Japan . |
| 3-99381A | 4/1991 | Japan . |
| 3-191489 | 8/1991 | Japan . |
| 3-257687 | 11/1991 | Japan . |
| 3-257686 | 11/1991 | Japan . |
| 3-273489 | 12/1991 | Japan . |
| 3-271987 | 12/1991 | Japan . |
| 4-5775 | 1/1992 | Japan . |
| 1445100 | 8/1976 | United Kingdom . |
| 2161631 | 1/1986 | United Kingdom . |

*Primary Examiner*—John Sheppard
*Assistant Examiner*—Michael G. Lee
*Attorney, Agent, or Firm*—Fay, Sharpe, Beall, Fagan, Minnich & McKee

[57] ABSTRACT

In a check-out system, in which a purchaser himself who intends to purchase commercial products performs a check-out processing, having a commercial product casted portion, a stocker for stocking the commercial products, a transport unit for transporting the commercial product from the commercial product casted portion to the stocker, and a commercial product identifying unit located between the commercial product casted portion and the stocker for identifying the commercial product transported from the commercial product casted portion, the commercial product casted portion is provided with a commercial product code inputting unit for inputting a commercial product code, and a commercial product detecting unit for detecting that the commercial product is put on the transport path, and the commercial product identifying unit is provided with a commercial product code reading unit for reading the commercial product code of the commercial product being transported; and a first mode in which when the commercial product detecting unit detects that the commercial product is put on the transport path, the commercial product of interest is started to be transported, and in accordance with the identification result provided by the commercial product identifying unit, the commercial product is selectively transported to either the stocker or the commercial product casted portion, and a second mode in which after the commercial product code has been input by the commercial product code inputting unit, the commercial product of interest is started to be transported, and also in accordance with the identification result provided by the commercial product identifying unit, the commercial product is selectively transported to either the stocker or the commercial product casted portion are provided.

24 Claims, 24 Drawing Sheets

U.S. PATENT DOCUMENTS

| | | | |
|---|---|---|---|
| 4,792,018 | 12/1988 | Humble et al. | 186/61 |
| 4,896,029 | 1/1990 | Chandler et al. | 235/494 |
| 4,920,255 | 4/1990 | Gabeler | 235/454 |
| 4,939,355 | 7/1990 | Rando et al. | 235/467 |
| 4,964,053 | 10/1990 | Humble | 235/383 X |
| 5,083,638 | 1/1992 | Schneider | 235/383 X |
| 5,140,141 | 8/1992 | Inagaki et al. | 235/462 |
| 5,177,345 | 1/1993 | Baitz | 235/462 |
| 5,252,814 | 10/1993 | Tooley | 235/383 |
| 5,256,864 | 10/1993 | Rando et al. | 235/462 |
| 5,308,960 | 5/1994 | Smith | 235/454 |
| 5,308,963 | 5/1994 | Baitz | 235/462 |

FIG.5

| CHECK DATA | | CONDITIONS | | | PROCESSING | |
|---|---|---|---|---|---|---|
| CLASSIFI-CATION | COMPARISON RESULT | STORE CLERK OPERATION | NUMBER OF PROVISIONAL DATA | | PRODUCT REGISTRA-TION PROCESSING | CHECK DATA PROCESSING |
| DECIDED DATA | COINCIDENCE | — | — | | REGISTRATION | — |
| | UN-COINCIDENCE | STORE CLERK | — | | REGISTRATION | REGISTRATION OF PROVISIONAL DATA |
| | | OTHER THAN STORE CLERK | — | | UNRAGISTRATION | OBTAINING OF UNCOINCIDENT DATA |
| | COINCIDENCE | — | DECIDED POSSIBLE NUMBER EXISTS | | REGISTRATION | REGISTRATION OF DECIDED DATA |
| | | — | DECIDED POSSIBLE NUMBER IS NAUGHT | | REGISTRATION | REGISTRATION OF PROVISIONAL DATA |
| DECIDED DATA | UN-COINCIDENCE | STORE CLERK | — | | REGISTRATION | REGISTRATION OF PROVISIONAL DATA |
| | | OTHER THAN STORE CLERK | SMALL | | REGISTRATION | REGISTRATION OF PROVISIONAL DATA |
| | | | LARGE | | UNRAGISTRATION | OBTAINING OF UNCOINCIDENT DATA |
| NAUGHT | — | — | — | | REGISTRATION | REGISTRATION OF PROVISIONAL DATA |

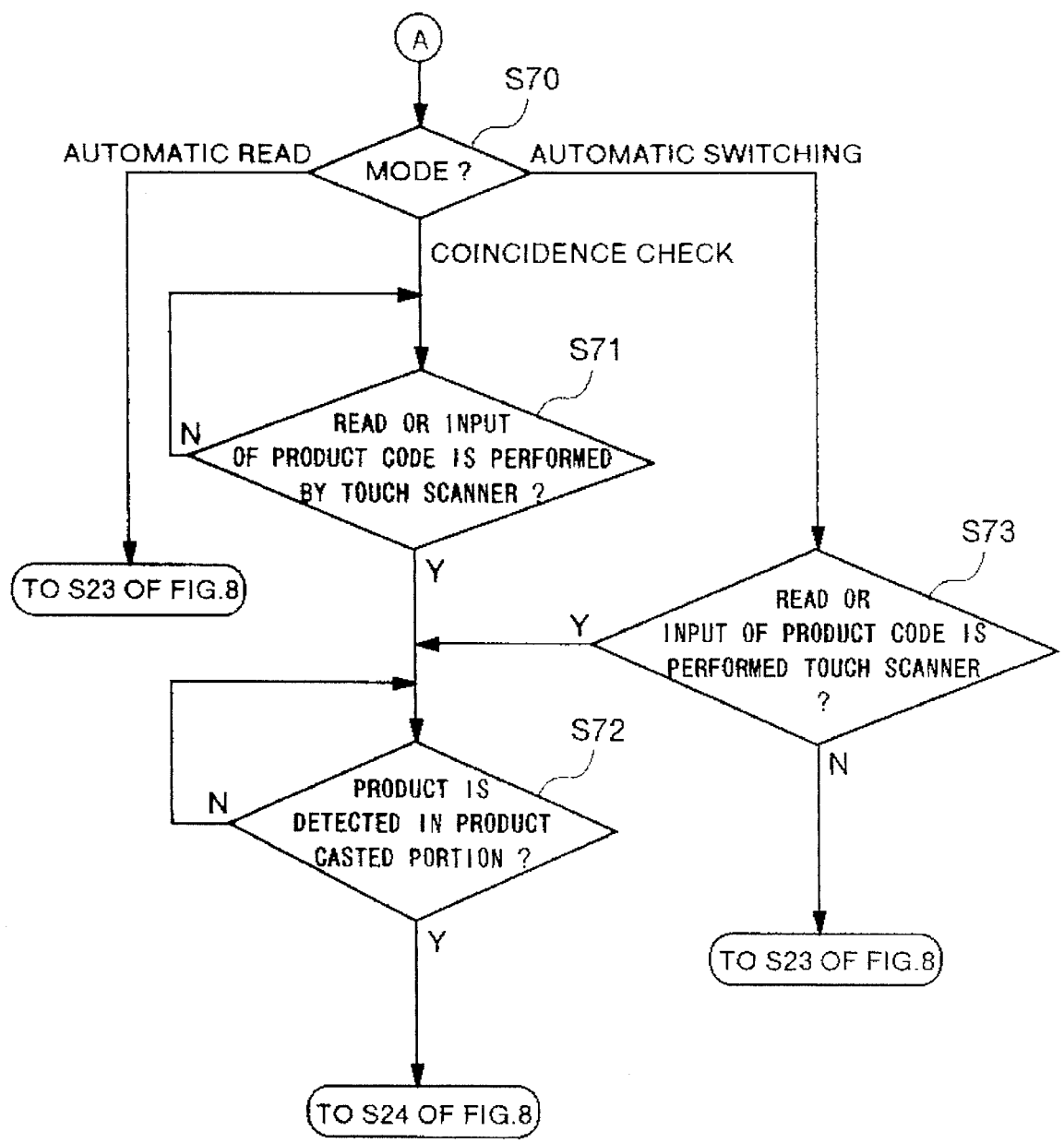

FIG.12A

PRODUCT INFORMATION

| PRODUCT CODE | PRODUCT NAME | UNIT PRICE | CHECK INFORMATION |
|---|---|---|---|
|  |  |  |  |

FIG.12B

DETAILS OF CHECK INFORMATION

| COLOR DATA | | | | | | | PRODUCT HEIGHT DATA | | | OTHER REGISTRATED DATA EXISTENCE/ UNEXISTENCE |
|---|---|---|---|---|---|---|---|---|---|---|
| R | | G | | B | | PROVISIONAL DATA EXISTENCE/ UNEXISTENCE | CEN-TRAL VALUE | ALLOW-ABLE ERROR(%) | PROVISIONAL DATA EXISTENCE/ UNEXISTENCE | |
| CEN-TRAL VALUE | ALLOW-ABLE ERROR(%) | CEN-TRAL VALUE | ALLOW-ABLE ERROR(%) | CEN-TRAL VALUE | ALLOW-ABLE ERROR(%) | | | | | |
|  |  |  |  |  |  |  |  |  |  |  |

FIG.12C

PROVISIONAL DATA

| PRODUCT CODE | COLOR DATA | | | | | | PRODUCT HEIGHT DATA | |
|---|---|---|---|---|---|---|---|---|
| | R | | G | | B | | | |
| | CENTRAL VALUE | ALLOW-ABLE ERROR(%) | CENTRAL VALUE | ALLOW-ABLE ERROR(%) | CENTRAL VALUE | ALLOW-ABLE ERROR(%) | CENTRAL VALUE | ALLOW-ABLE ERROR(%) |
| | | | | | | | | |

FIG.13

MEMBER INFORMATION

| MEMBER NUMBER | MEMBER NAME | PERMISSION DEGREE OF PRODUCT CHECK (%) |
|---|---|---|
| | | |

SELF CHECK-OUT SYSTEM AND POS SYSTEM

CROSS-REFERENCE TO RELATED APPLICATIONS

This application is a CIP of a U.S. patent application Ser. No. 08/197,268 filed on Feb. 16, 1994, now abandoned, the disclosure of which is hereby incorporated by reference.

BACKGROUND OF THE INVENTION

The present invention relates to a check-out system of a self-service type which is utilized in a supermarket and the like and is operated by a purchaser himself, who intends to purchase the desired commercial products, in order to check out the price for the commercial products, and more particularly to a check-out system and a POS system utilizing the same which are capable of reducing the operations performed by a purchaser so that the laber of the purchaser is saved.

In recent years, in a supermarket, a convenience store and the like, a check-out system of a self-service type has been used which is operated by a purchaser himself to check-out the price for purchased commercial products.

Heretofore, as for the check-out systems of this sort, there is known a system which is disclosed in U.S. Pat. No. 4,792,018 and U.S. Pat. No. 4,676,343 (Articles 1 and 2). This system is a check-out system wherein the system of interset has an inlet portion into which commercial products, which are to be purchased by a purchaser, are casted, a transport conveyor for transporting the commercial products from the inlet portion to an outlet through an intermediate tunnel area (a maintenance area), and a stocker for bagging the commercial products which have been transported to the outlet, and the purchaser puts the commercial products on the transport conveyor after the purchaser made a commercial product code reader (a scanner), which is provided in the inlet portion, read out the commercial product codes and the like of the commercial products to be purchased, and the commercial products are checked by means for checking commercial products which is provided in the middle of the transport path, e.g., in the tunnel area.

In such a check-out system in which the purchaser registrates the commercial products by self-service, it is necessary to detect and prevent the malfunction, such as double registration and an omission of registration of the commercial products, due to inexperience of the operator (the purchaser), and a unjust operation such as an operation of substituting another commercial product for one commercial product and an operation of running away with the unregistrated commercial product(s).

A method of checking commercial products by the commercial product checking means of the system disclosed in the above-mentioned Articles 1 and 2 includes the steps of measuring, every commercial product, the commercial product characteristics (the commercial product characteristic data) such as weight and size by a unit provided in the tunnel area for measuring commercial product characteristics (a commercial product characteristic sensor) and comparing the characteristic data of the commercial product which is previously registrated every commercial product with the data which is obtained by the actual measurement by the commercial product characteristics measuring unit to check whether or not both the data coincides with each other.

Then, the unjust operation is prevented in such a way that if both the data coincides with each other, the commercial product is transported to the stocker, but if both the data does not coincides with each other, the conveyor is fed backwardly to return the commercial product of interest to the inlet portion.

Incidentally, as auxiliary check means of the above-mentioned commercial product checking means, there has also been proposed means wherein a second commercial product code reader is provided within the tunnel area in order to compare the resultant data with the data relating to the commercial product code which has been read out by the commercial product code reader provided in the inlet portion.

In addition, as a similar system to the above-mentioned system, there is known a system disclosed in JP-A-3-257686 (Article 3). This system is constructed in such a way that the commercial products which are to be purchased are put on a conveyor by a purchaser to transport the commercial products, the commercial product codes of the commercial products, which have been successively transported, are read out in turn by an optical scanning unit, and the weight of the commercial products is checked by a unit for detecting weight.

Further, a POS system is realized now in which such a self check-out system and a POS system of a checker operation type by which a checker as a store clerk performs check-out are mixedly installed.

The prior art disclosed in the above-mentioned Articles 1 and 2 is an effective system in terms of preventing the malfunction and the injustice in the case where instead of the store clerk, the purchaser purchases the desired commercial products and performs the check-out by himself. However, when the purchaser (the operator) intends to purchase the desired commercial products, it is required that after the individual commercial products are applied to the commercial product code reader one by one, they are put on the transport conveyor. Therefore, this operation imposes a burden on the purchaser, and thus, this is troublesome, takes time and may result in the malfunction being caused.

On the other hand, in the prior art disclosed in the above-mentioned Article 3, the registration of the commercial products is performed on the basis of the simple operation of doing nothing but placement of the commercial products on the conveyor. However, some commercial products may readily fall down or may crease easily. Therefore, as compared with the case where the commercial product codes are read out by the manual operation, the commercial products the commercial product codes of which can not be read out may be easy to be found out.

In the above-mentioned Article 3, it is proposed that for the commercial products the commercial product codes of which could not be read out, the commercial product codes thereof are input by the store clerk. However, since the labor of the store clerk is required, the advantage of reducing the man power in the store is necessarily decreased.

In addition, the above-mentioned prior art has the following problems associated therewith.

(1) There may occur the case where after once the commercial product code has been input, the purchase of the associated commercial product is wanted to be cancelled. However, it is not taken into consideration at all that after the commercial product of interest has been put on the convey unit, the registration of the commercial product of interest is cancelled.

(2) Since the operation for preparing the commercial product characteristic data of the check-out system takes a lot of time, the check-out system can not be used until the commercial product characteristic data is prepared.

(3) If the check is rigidly performed, since even the commercial products each having a small measurement error is caught in the check and thus the reoperation is required, it takes a lot of time. Therefore, the operation efficiency is reduced, and this results in congestion. On the other hand, if the check is mitigated, the check accuracy for the high price commercial product for which the sufficient check is required will be necessary the same as that for the cheep commercial product.

(4) For the purpose of preventing the injustice, the monitoring is performed by utilizing the monitoring camera. However, if the number of monitoring cameras is large, the possibility that such injustice is missed is increased.

Further, in the POS system in which such a self check-out system is combined with the POS system of a checker operation type, since the check-out system is available for reducing the man power in the store, there is the advantage to be utilized on the part of the store. However, on the part of the purchasers, as compared with the POS system of a checker operation type, the more troublesome operation called the check-out needs to be performed by the purchasers themselves. Therefore, there is also a problem that although the POS system of a self check-out type is introduced, the self check-out system is not used by the purchasers. Rather, finally the purchasers concentrate on the POS system of a checker operation type, and as a result, the operational efficiency of the whole POS system is reduced.

SUMMARY OF THE INVENTION

The present invention was made in order to solve the above-mentioned problems associated with the prior art, and it is therefore an object of the present invention to provide a check-out processing which is executed on the basis of the operation by a purchaser to perform check-out of the price for commercial products purchased and is utilized in a self check-out system which is capable of executing the check-out processing without any store clerk and also of reducing the operation by the purchaser, i.e., to provide a check-out system which is capable of reading out commercial product codes and the like, of the commercial products, which are difficult for the purchaser to be read out by automatic operation or can not be read out by automatic operation, before loading the commercial products of interest on a belt conveyor, thereby performing the registration of the commercial products.

Other objects of the present invention are as follows.

It is another object of the present invention to provide a check-out system in which the commercial products are loaded on a belt conveyor to read out the commercial product codes thereof, and when the operation for automatically reading out the commercial product codes is not successful, a purchaser is permitted to input the commercial product codes of interest manually, without the interposition of a store clerk.

In addition, it is still another object of the present invention to provide a check-out system in which a purchaser looks at an indication of a product name and a unit price of the commercial product corresponding to the commercial product code which is read out during transport of the commercial product of interest so that the purchaser can cancel the registration thereof, the characteristic data for checking commercial products can be automatically produced, the permission degree of the commercial product check measurement error can be changed in accordance with the degree of bustling of members (purchasers) in a store, the prices of the commercial products, the conditions of the operation, and the like, and both the maloperation and the unjust operation can be monitored.

Further, it is yet another object of the present invention to provide a POS system in which even in a check-out system, which a consumer (a purchaser) himself operates in individual a POS system of a checker operation type and a check-out system, the consumer can perform check-out, and as a whole of the POS system, the flow (i.e., the load) of the check-out by the purchaser can be dispersed.

In order to attain the above-mentioned objects, in a check-out system having a portion into which commercial products are casted, a stocker for stocking the commercial products, transport means for transporting the commercial products from the commercial product casted portion to the stocker, and a commercial product identifying unit located between the commercial product cased portion and the stocker for identifying the commercial products transported from the commercial product casted portion, the check-out system comprises: a commercial product code inputting unit for inputting a commercial product code; a commercial product detecting unit for detecting that the commercial product is put on the transport path, the commercial product casted portion being provided with the commercial product code inputting unit and the commercial product detecting unit; a commercial product code reading unit for reading out a commercial product code of the commercial product which is transported to the commercial product identifying unit; and a transport controlling unit having a first mode in which when it is detected by the commercial product detecting unit that the commercial product is put on the transport path in the commercial product casted portion, the commercial product of interest is started to be transported, and in accordance with the identification result provided by the commercial product identifying unit, the commercial product of interest is selectively transported to either the stocker or the commercial product casted unit, and a second mode in which after the commercial product code is input by the commercial product code inputting unit, the commercial product of interest is started to be transported, and also in accordance with the identification result provided by the commercial product identifying unit, the commercial product of interest is selectively transported to either the stocker or the commercial product casted portion.

Since there are provided the first mode (the automatic read mode) in which before casting the commercial product, an operator does not input manually the commercial product code and the second mode (the coincidence check mode) in which before casting the commercial product, the operator input manually the commercial product code, the proper use can be performed in such a way that when saving the labor is given top priority, the first mode is selected, whereas when increasing the reading accuracy is given top priority, the second mode is selected. For example, in the case where first, in the first mode, the normal read-out was not performed, next, the mode can be switched to the second mode to perform the reprocessing.

In addition, the commercial product identifying unit utilizes, for the transport control, whether or not in the first mode, the commercial product code was read out by the commercial product code reading unit as the identification of the commercial product. Then, if not, the commercial product of interest is returned to the commercial product casted portion.

By adopting the above-mentioned structure, the operator can input the commercial product code in the commercial product code inputting unit of the commercial product casted portion, and thus the interposition of the store clerk becomes unnecessary.

In addition, the check-out system is provided with: single commercial product checking means for checking whether or not a commercial product put on the transport path is single; cancel means for displaying, on the basis of a commercial product code, both a commercial product name and its unit price of the corresponding commercial product from commercial product information, which is previously set every commercial product, in order to notify an operator of both the commercial product name and its unit price, and for returning the commercial product of interest to the commercial product casted portion if the operator indicates that the registration of the commercial product of interest is cancelled; measurement means for measuring the characteristics of a commercial product; check means for checking whether or not the measured characteristic data of the commercial product is within a range of an allowable error with respect to the characteristic data of the registered commercial product; means for arbitrarily setting the range of the allowable error every ID of the operator, commercial product and time zone; photographing and projection means for monitoring an operator; abnormality or injustice detecting means for detecting abnormality or injustice of the operation; means for outputting, when detecting either the abnormality or injustice of the operation, an alarm signal by the projection means; and the like.

Further, in a check-out system in which a POS system of a checker operation type, in which check-out is performed by an operation of a checker in a store and a POS system of a self check-out type in which a purchaser himself performs check-out are placed side by side, the POS system of a self check-out type is provided with: a point number calculating unit for calculating the number of points in accordance with purchased commercial products or the total amount of purchase; a point number summing unit for summing up the calculated numbers of points every purchase; a judgement unit for judging whether or not the total number of points obtained every purchaser from the point number summing unit reaches a predetermined value; and a discount processing unit for performing, when the total number of points reaches the predetermined value, a discount processing for an amount of purchase of the corresponding purchaser.

Thus, by providing the check-out system with the means for point service, in the POS system of the store in which the POS system of a checker operation type and the check-out system are placed side by side, the flow of the purchasers to the check-out system which needs to be operated by the purchaser himself can be caused to occur to dispose the loads on the checker.

BRIEF DESCRIPTION OF THE DRAWINGS

FIG. 5 is a view showing conditions for producing data for check;

FIG. 11 is a flow chart showing a function of switching a mode according to an embodiment of the present invention;

FIGS. 12A to 12C are schematic views showing a structure of commercial product data;

FIG. 13 is a schematic view showing a structure of member information of members as purchasers;

DESCRIPTION OF THE PREFERRED EMBODIMENTS

The preferred embodiments of the present invention will hereinafter be described in detail with reference to the accompanying drawings.

Figure 1A:
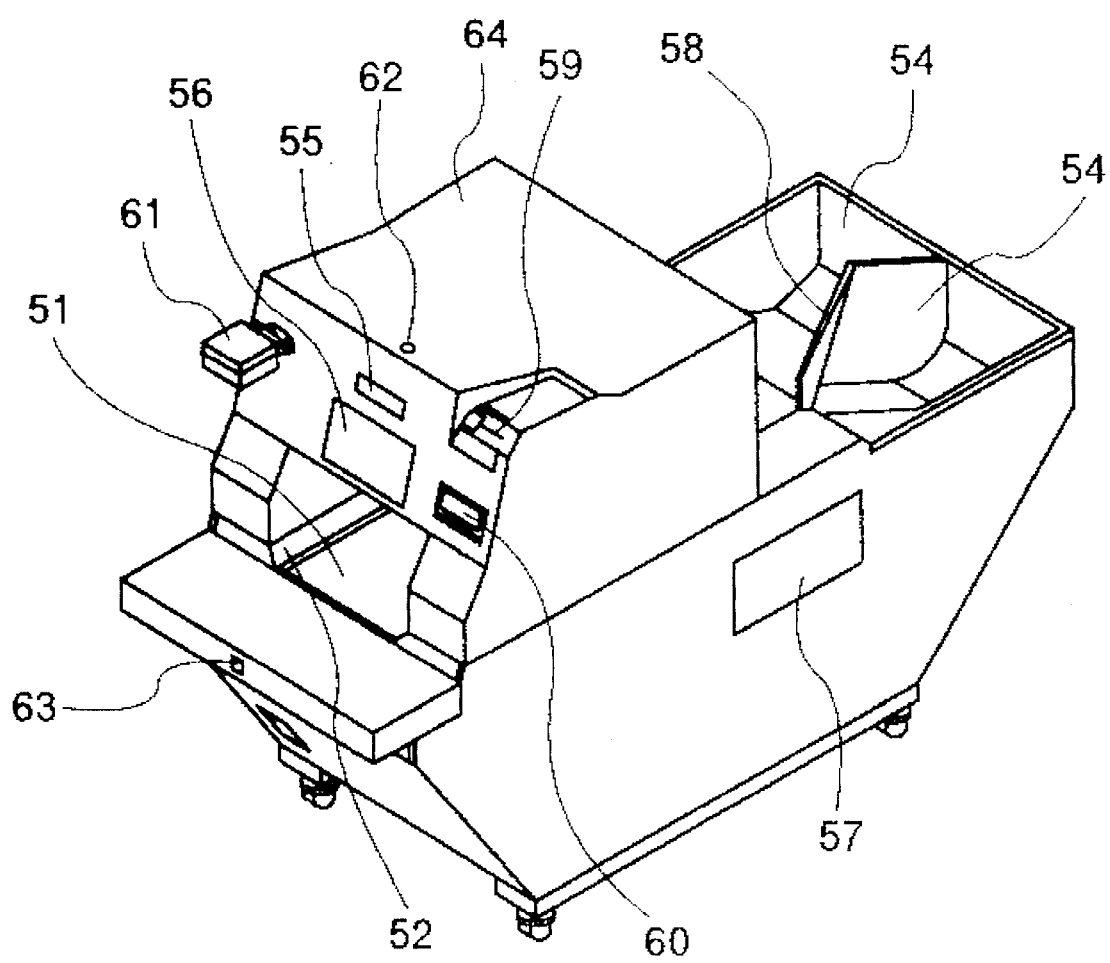
FIG. 1A is a perspective view showing construction of a self check-out system of a first embodiment according to the present invention.
Figure 2:
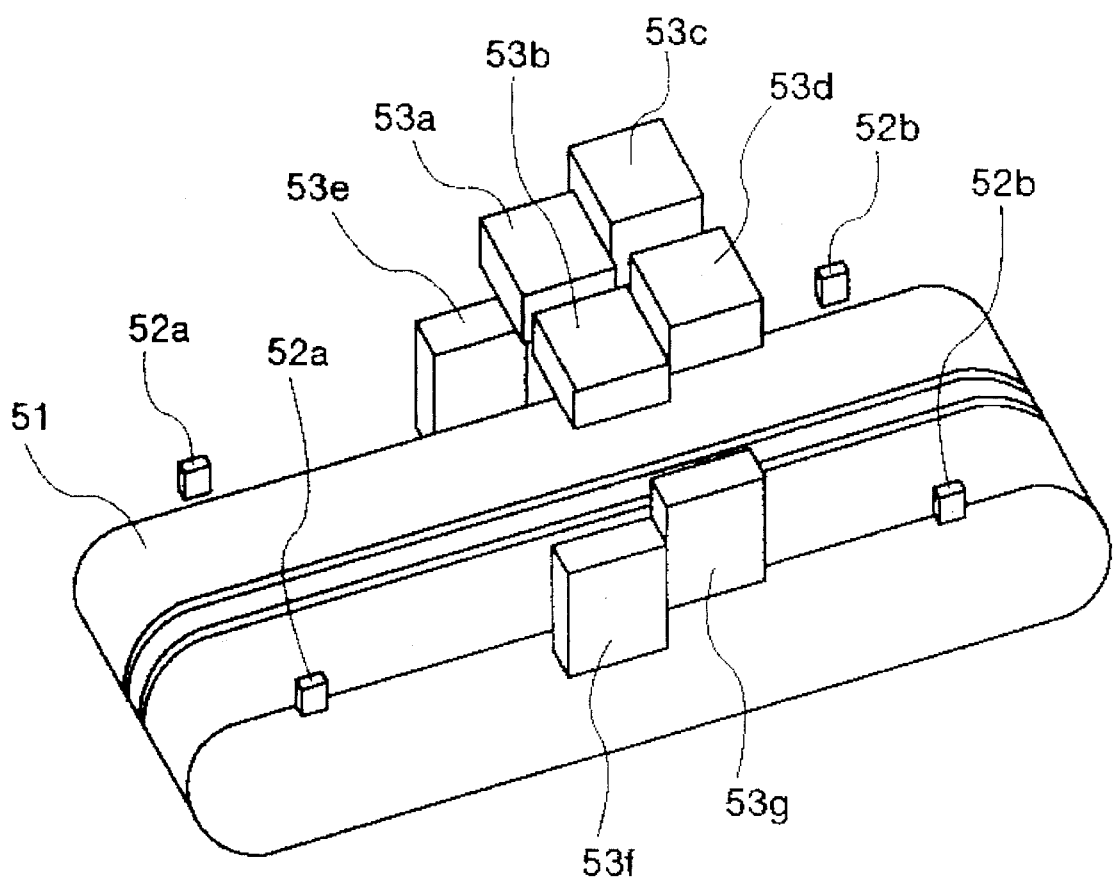
FIG. 2 is a perspective view showing construction of a main portion of the first embodiment shown in FIG. 1A.

FIGS. 1A and 2 are respectively schematic views each showing construction of a self check-out system 109, which is constructed in correspondence to a front operation, according to one embodiment (a first embodiment) of the present invention, wherein FIG. 1A shows a perspective view and FIG. 2 shows the main portion of the inside thereof.

The self check-out system is constituted by a belt conveyor 51 for transporting commercial products, commercial product sensors 52 for detecting the commercial products optically for example (reference numeral 52a designates each of front commercial product sensors 52a and reference numeral 52b designates each of rear commercial product sensors), a scanner 53 for reading out, in the inside thereof, a bar code of the commercial product (reference numerals 53a to 53g designate individual scanners), a stocker 54 divided into two portions for stacking the commercial products, a display 55 for displaying both the operation guidance and the commercial product information, a keyboard 56 by which normally, an operator as a purchaser commands the desired processing, a stopper 57 for prohibiting the purchaser from passing therethrough, a switching lever 58 for switching the stocker for stocking the commercial products, a printer 59 for printing an itemized list (a receipt), a magnetic card reader/writer 60, a scanner 61 which is attached to a front panel so as to be able to change its angle and operates to read out the bar code of the commercial product by the operation of the operator, a store clerk call lamp 62 for indicating a call for a store clerk, and an operator sensor 63 for detecting the operator.

The inside scanners 53 are provided in a mount portion, i.e., in an inner face of a tunnel portion 64 shown in FIG. 1A. In addition, the keyboard 56, the display 55, a card insertion/detachment window of the magnetic card reader/writer 60, a receipt discharging portion of the printer 59, and the like are, as shown in FIG. 1A, provided in the front panel provided in a mount portion 64. The store clerk call lamp 62 is provided in a upper front portion of the mount portion 64, and the operator sensor 64 is provided in a front face of a commercial product stage. On the surface of the belt conveyor 51, cleats are provided in a transport direction in order to prevent the tubular round commercial product from rolling.

First, when it has been detected by the operator sensor 63 that the operator stands in front of the self check-out system of the present embodiment, the system goes to an operatable state, and then the display for showing the operation method is indicated in the display 55. At this time, the belt conveyor 57 is in a stop state and the stopper 57 is in a passing prohibition state.

The operator puts the commercial products to be purchased on the belt conveyor 51 with the bar code labels of those products directed upwardly or horizontally. Then, the commercial product detection sensors 52a of the commercial product casted portion detect each commercial product, and a transport controlling unit as will be described later causes the belt conveyor 51 to begin to transport forwardly the commercial product towards the stocker 54. When the commercial product is passed through the read area of the scanner 53, the bar code label of the commercial product is read out to recognize its commercial product code.

In order to increase the read-out rate of the scanners 53, as shown in FIG. 2, a plurality of scanners 53a to 53d for scanning the upper face of the commercial product are provided so as for the reading area to cover the whole width of the belt conveyor 51, and a plurality of scanners 53e and 53f for scanning the side face of the commercial product so as to increase the reading area. When the commercial product has been detected by the rear commercial product sensors 52b which are located between the scanners 53 and the stocker 54, in the case where the bar code of the commercial product was read out, the transport of the belt conveyor 51 is stopped at that position. On the other hand, in the case where the bar code of the commercial product could not be read out, the transport controlling unit feeds the belt conveyor 51 backwardly so that the commercial product of interest is transported towards the commercial product casted portion. In the case where the bar code of the commercial product was read out during the backward feed, the belt conveyor 51 is again fed forwardly, and the commercial product is stopped at the position of the rear commercial product sensors 52b.

In the case where the bar code of the commercial product can not be read out during the backward feed, the belt conveyor 51 is stopped at the position where the front commercial product sensors 52a are to detect the commercial product, and then the display for commanding the operator to perform the reoperation is displayed on the display 55. In the case where the bar code of the commercial product could be read out, the corresponding commercial product information is displayed on the displayed 55 on the basis of the commercial product code thereof, and then that commercial product is registrated. When the next commercial product is casted, the commercial product which is being stopped in front of the stocker is put into the stocker 54 along with the transport of the next commercial product.

In the case where instead of casting the next commercial product, an instruction of cancelling the commercial product which is stopped in front of the stocker 54 is issued by the keyboard 56, the belt conveyor 51 is fed in the opposite direction, whereby that commercial product is returned to the commercial product casted portion to stop the belt conveyor to cancel the registration. In the case where the bar code of the commercial product can not be read out or the bar code thereof is difficult to be read out, after the operator has read out the bar code of the commercial product using the scanner 61 provided in the front face, that commercial product is put on the belt conveyor 51.

In addition, in the case where the read-out can not be performed many times, the store clerk call lamp 62 is turned on, whereby the assistance of the store clerk is roused. At the time when all the commercial products to be purchased have been registered, the operator instructs the completion of the registration using the keyboard 56. Then, the magnetic card reader/writer 60 is enabled. Then, when the operator inserts the card for payment, the magnetic card reader/writer 60 reads out the information stored in the card, executes the processing for payment and discharges the card after completion of that processing. At the same time, an itemized list (a receipt) is issued by the printer 59. In addition, by operating the switching lever 58, the prior stocker is switched to the next stocker for stocking the next commercial product.

When the operator has received the receipt, the stopper 57 goes to a passable state. Then, when the operator has moved up to the position of the stocker 54, the stopper 57 goes to a passing prohibition state again. Finally, the operator takes out the commercial products from the stocker 54. When the next operator starts the operation, the commercial products are stocked one by one in another stocker different from the adjacent stocker from which the commercial products are being taken out by the prior operator. Incidentally, the mount portion 64 has the sufficient height and width so as for the purchaser (the operator) not to cast and commercial product on the outlet side belt conveyor over the mount portion 64. By providing, in the belt conveyor of the transporting portion, the irregularity, the inclined position and the vibrating portion, a rotatable product can be fixed and a plurality of products stacked can be separated to individual products by vibration, resulting in illegality prevention and an improvement of transport accuracy.

Figure 3:
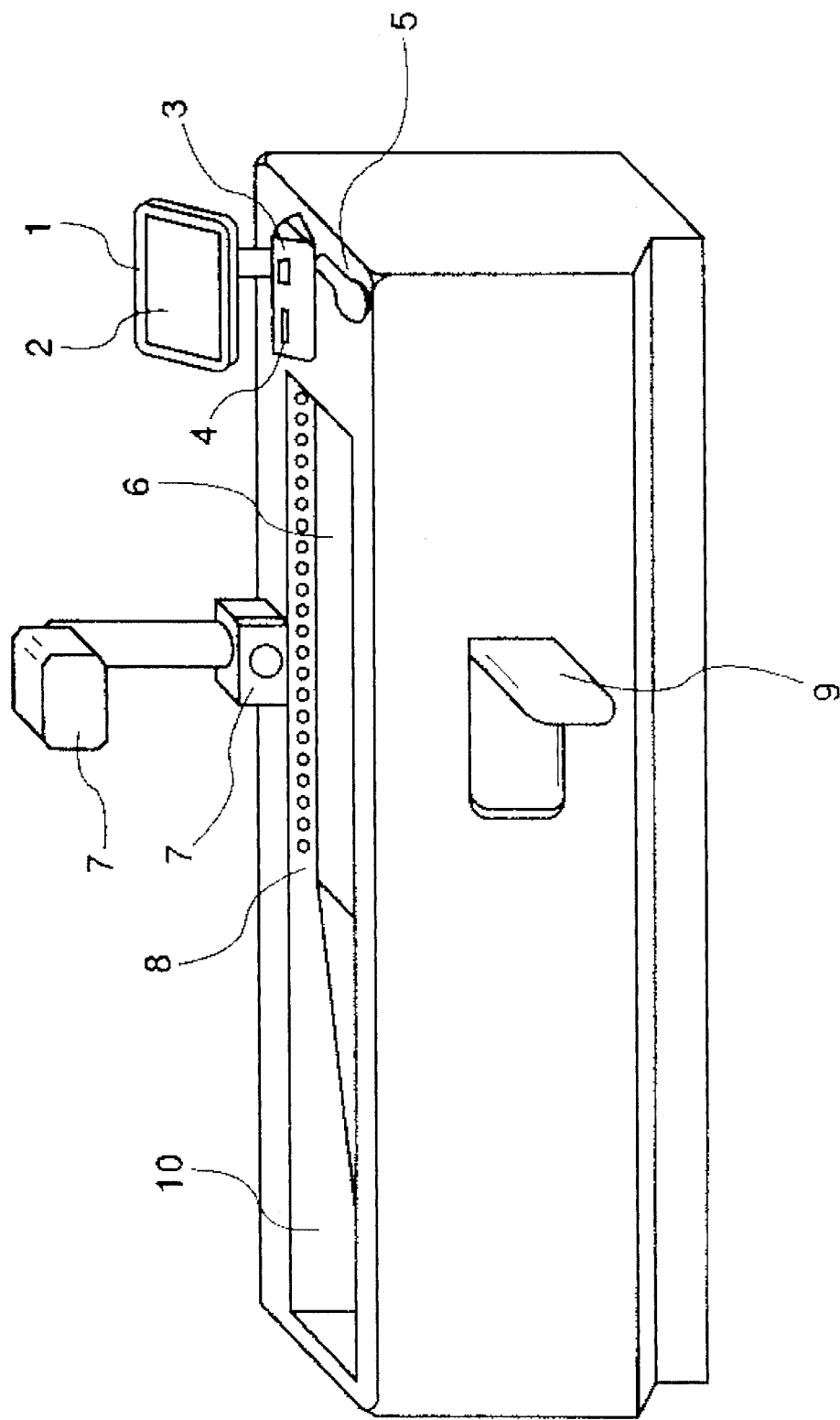
FIG. 3 is a perspective view showing construction of a self check-out system of a second embodiment according to the present invention.

FIG. 3 is a perspective view showing construction of another embodiment (a second embodiment) of the self check-out system, according to the present invention, in which the construction for the horizontal operation is provided with the function of preventing injustice. Points of difference of the present embodiment from the first embodiment (refer to FIGS. 1A and 2) are that (the first embodiment is of a vertical operation type, whereas) the horizontal operation type is adopted in which the operator confronts with the system horizontally, that (in the first embodiment, the scanner 61 is mounted pivotably to the front panel, whereas) a hand scanner 5 is adopted by which the commercial product code added to the commercial product can be read out with the scanner held by the operator, that (in the first embodiment, the various key inputs such as a cancel key input and the like are performed using the keyboard 56, whereas) the similar input is performed using a touch panel 2, that (in the first embodiment, the commercial product sensors 52 are provided only in the inlet and outlet, whereas) in order to enable even the gap occurring when two or more commercial products are casted to be detected, commercial product sensors 8 are substantially continuously arranged from the inlet to the outlet, that (in the first embodiment, the scanner 53 such as a line scanner is employed, whereas) two CCD cameras 7, i.e., one CCD camera for photographing the upper face of the commercial product and the other CCD camera for photographing the side face thereof are provided each of which is capable of photographing the two-dimensional plane, and that only one commercial product stocker 10 is provided. Other construction of the present embodiment is the same as that of the first embodiment.

The description will hereinbelow be given with respect to the control method employing the present embodiment. The present self check-out system is constituted by a commercial product registrating unit having a display 1 with a touch panel 2, a printer 3, a card reader 4, a touch scanner 5, and a commercial product casted portion to a belt conveyor 6, a commercial product recognizing unit having a CCD camera 7 which is located in the middle of the transport path of the belt conveyor 6, and a commercial product stocking unit having a commercial product stocker 10. In addition, the present system is provided with multiple commercial product detecting sensors 8 provided along the transport path of the belt conveyor 6, and a stopper 9 provided between the operation unit and the identification unit for prohibiting the purchaser from passing therethrough. In the present embodiment, in correspondence to the positions of the commercial product code symbols, two CCD cameras, i.e., one CCD camera for photographing the upper face of the commercial product and the other CCD camera for photographing the back face thereof are employed.

In the commercial product registrating unit, the passing of the purchaser is interrupted, and thus, any commercial product stocked in the commercial product stocker 10 can not be taken out until the processing of registering the commercial product and the payment processing are completed. Therefore, it is possible to prevent such an unfair practice as to stock directly the commercial product which is not registered into the commercial product stocker 10.

Next, the description will hereinbelow be given with respect to an example in which the payment is performed using a membership card. As for the operation, firstly, the purchaser makes the card reader 4 read out the information stored in the membership card. Next, the commercial product is put on the belt conveyor 6 in the commercial product casted portion with the commercial product code label of the commercial product directed upwardly or backwardly. Then, the commercial product is automatically transported and the operation for reading out and checking the commercial product code is performed. If normal, both the name and the price of the commercial product are displayed on the display 1.

The operators confirms this displayed result and then casts the next commercial product into the belt conveyor. If abnormal, since the commercial product of interest is returned to the product casted portion, the operator takes out the commercial product of interest and after confirming the commercial product of interest, performs the reoperation. For the commercial product the commercial product code of which is difficult to be read out, the procedure may be adopted such that after the commercial product code has been read out by the touch scanner 5 or has been input using the touch panel 2, the commercial product of interest is casted.

In the case where after casting the commercial product, the operator looks at the display to cancel the registration of the commercial product, the cancel key is input through the touch panel 2. As a result, the commercial product of interest is returned to the product casted portion. In the case where the registration of all the commercial products to be purchased is completed, if the end key is input through the touch panel 2, the receipt is issued from the printer 3 and then the stopper 9 is released. Then, the operator receives the receipt, moves to the stocker 10 and receives the commercial products.

This operation will hereinbelow be described on the basis of the actual mechanical and electrical motions. When the card has been inserted, the card reader 4 reads out the information stored in the card and then discharges the card. The belt conveyor 6 transports the commercial product between the product casted portion and the commercial product stocker 10 in both the directions, i.e., in the forward and reverse directions. A plurality of commercial product sensors 8 are disposed along the transport path of the belt conveyor 6 in order to perform both the detection of the commercial product and the monitoring of the movement thereof.

When the commercial product has been detected by the commercial product sensor(s) provided in the product casted portion, the belt conveyor 6 is driven in the forward direction to transport the commercial product to the photographing area of the CCD camera 7 which operates to read out and check the commercial product code of the commercial product. Then, when detecting the commercial product, the CCD camera 7 adjusts its focal point on the upper face of the commercial product to fetch the data relating to the image of the commercial product. At this time, from the data relating to the position of the focus of the CCD camera 7 for photographing the upper face of the commercial product, the data relating to the height of the commercial product is also obtained.

The display 1 displays the information relating to the operation procedure, the commercial product name and the unit price of the registered commercial product, and the input items of the touch penal 2. The touch panel 2 selects and detects the item(s) displayed on the display 1. The touch scanner 3 is approached to the commercial product code label of the commercial product by the manual operation, thereby reading out the commercial product code. The printer 3 issues the receipt on which the commercial names and the costs of the registered commercial products and the total amount are printed. The stopper 9 opens and shuts the lever for interrupting the passage of the purchaser.

Figure 1B:
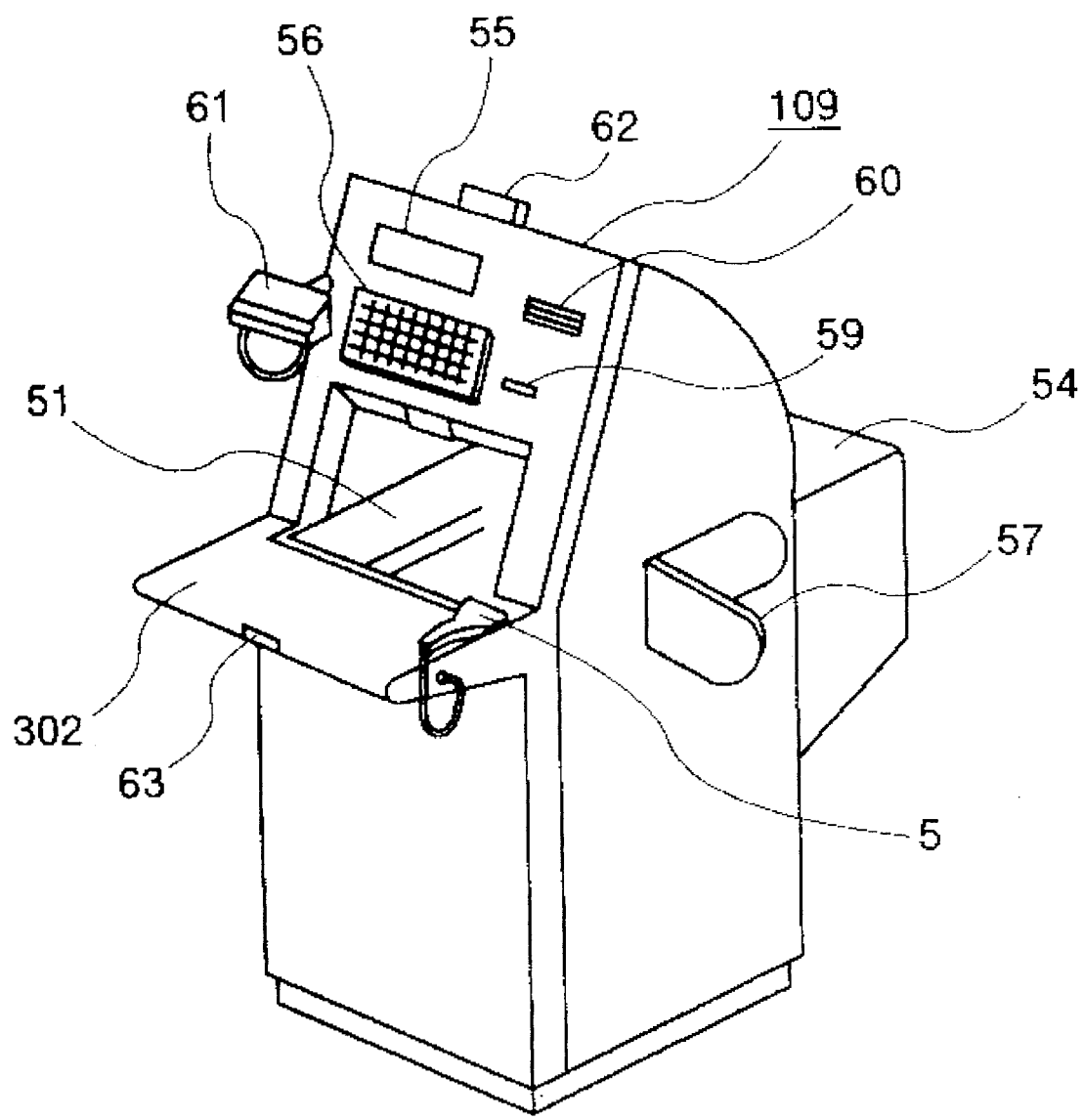
FIG. 1B is a perspective view showing construction of a self check-out system of a third embodiment according to the present invention.

FIG. 1B shows another example (a third embodiment of the self check-out system. A point of difference of the present embodiment from the first embodiment of FIG. 1A is that the check-out system is provided with both a purchaser scanner 61 and a hand scanner 5. Other construction of the present embodiment is the same as that of the first embodiment of the self check-out system shown in FIG. 1A. In addition, reference numeral 302 designates a place for the commercial products of the self check-out system 109.

Figure 4:
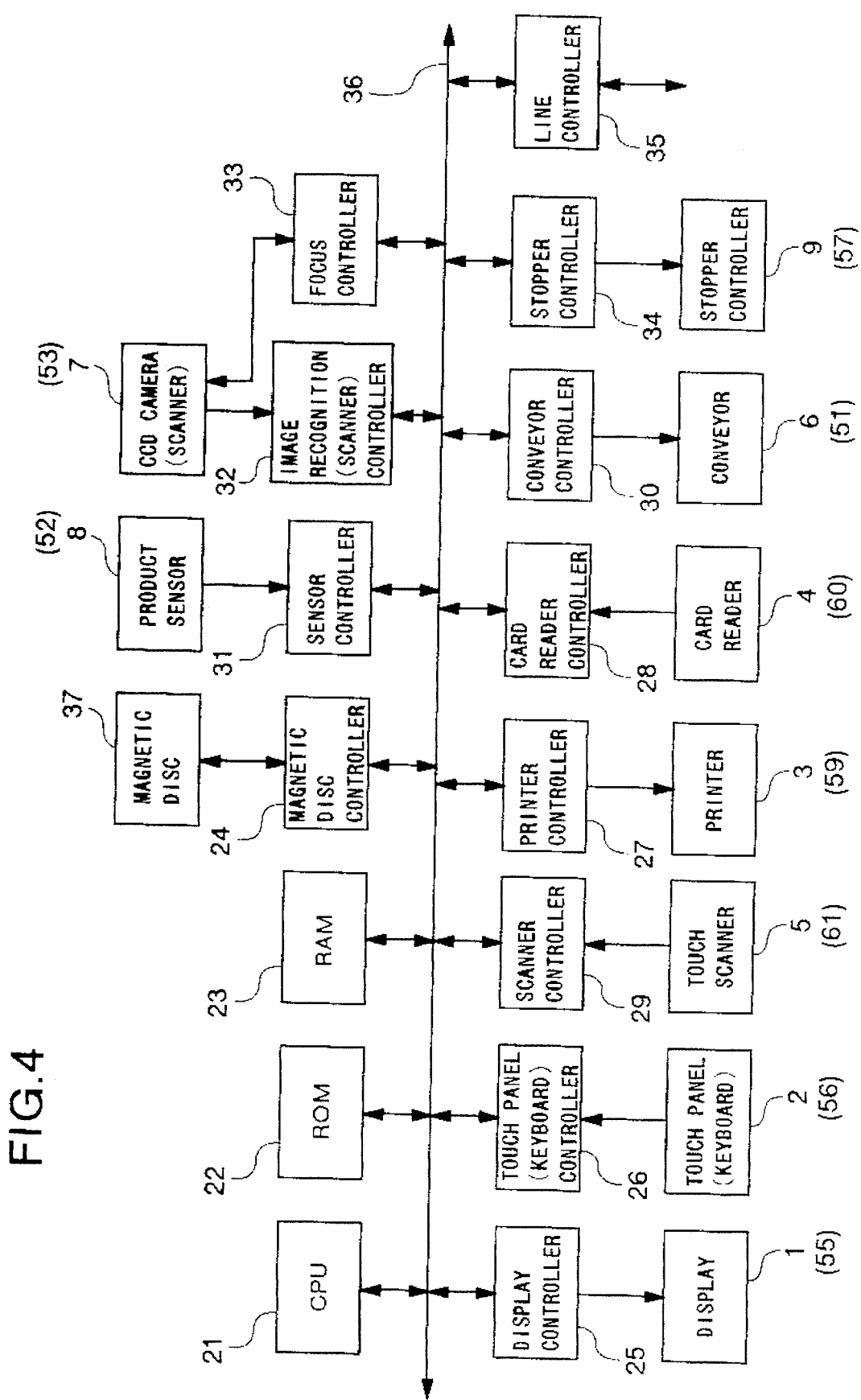
FIG. 4 is a block diagram showing a configuration of a control circuit according to an embodiment of the present invention.

FIG. 4 is a block diagram showing a configuration of the control unit which is common to the first embodiment (refer to FIGS. 1A and 2), the second embodiment (refer to FIG. 3) and the third embodiment (refer to FIG. 1B). But, in the following description, the second embodiment (refer to FIG. 3) is mainly described, and with respect to the first and third embodiments, the corresponding reference numerals are put in parentheses and the detailed description thereof will emitted here for the sake of simplicity. Incidentally, in FIG. 4, the unit which is constituted by an image recognition controller 32 and a focus controller 33 corresponds to a scanner controller in the case of the first embodiment.

In addition, for the sake of simplicity, in FIG. 4, the illustration of the control circuit for controlling the switching lever 58, and the store clerk lamp 42 and the circuit for operating the commercial product sensors 52 is omitted. In FIG. 4, to a CPU 21 for performing the control are connected through an address data bus 36 a ROM 22 for storing a program, a RAM 23 for storing the control data of the program and the commercial product information, a magnetic disc controller 24, a display controller 25, a touch panel controller (or a keyboard controller)26, a scanner controller 29, a printer controller 27, a card reader controller 28, a sensor controller 31, a conveyor controller 30, an image recognition controller (or a scanner controller) 32, a focus controller 33, a stopper controller 34, and a line controller 35.

A magnetic disc 37 is connected to the magnetic disc controller 24, the display 1 (or 55) is connected to the display controller 25, the touch panel 2 (or the keyboard 56) is connected to the touch panel (or the keyboard) controller 26, the touch scanner 5 (or 61) is connected to the scanner controller 29, the printer 3 (or 59) is connected to the printer controller 27, the card reader 4 (or 60) is connected to the card reader controller 28, the commercial product sensors 8 (or 52) are connected to the sensor controller 31, the belt conveyor 6 (or 51) is connected to the conveyor controller 30, the CCD camera 7 (or the line scanner 53) is connected to both the image recognition controller 32 and the focus controller 33, and the stopper 9 (or 57) is connected to the stopper controller 34. In addition, a monitor is connected to the line controller 35.

The CPU 21 controls the above-mentioned individual controllers in accordance with the program stored in the ROM 22. FIGS. 7 to 11 show the processing flow (the flow chart) of that program.

Figure 7:
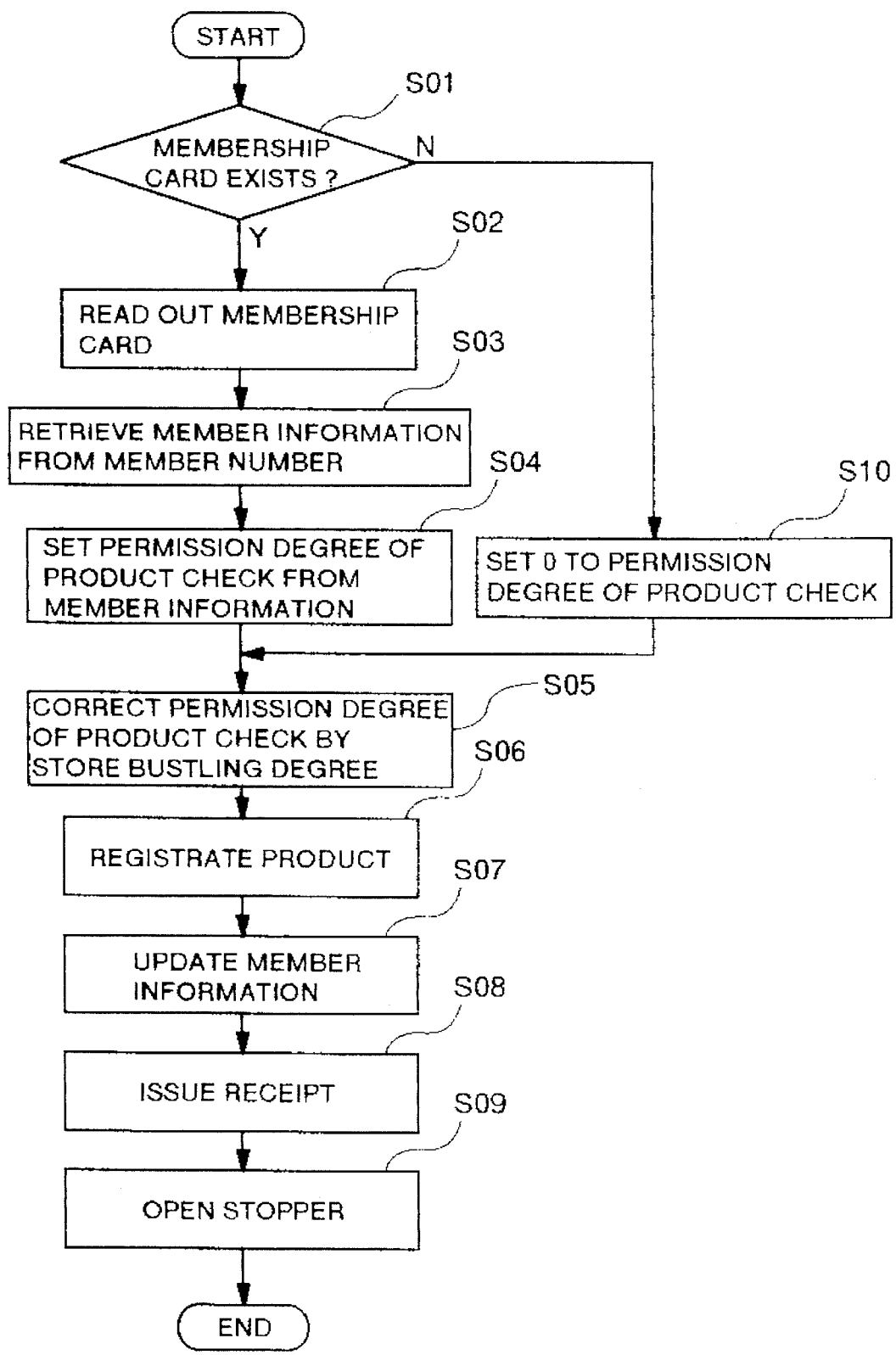
FIG. 7 is a flow chart showing the whole processing according to an embodiment of the present invention.
Figure 8:
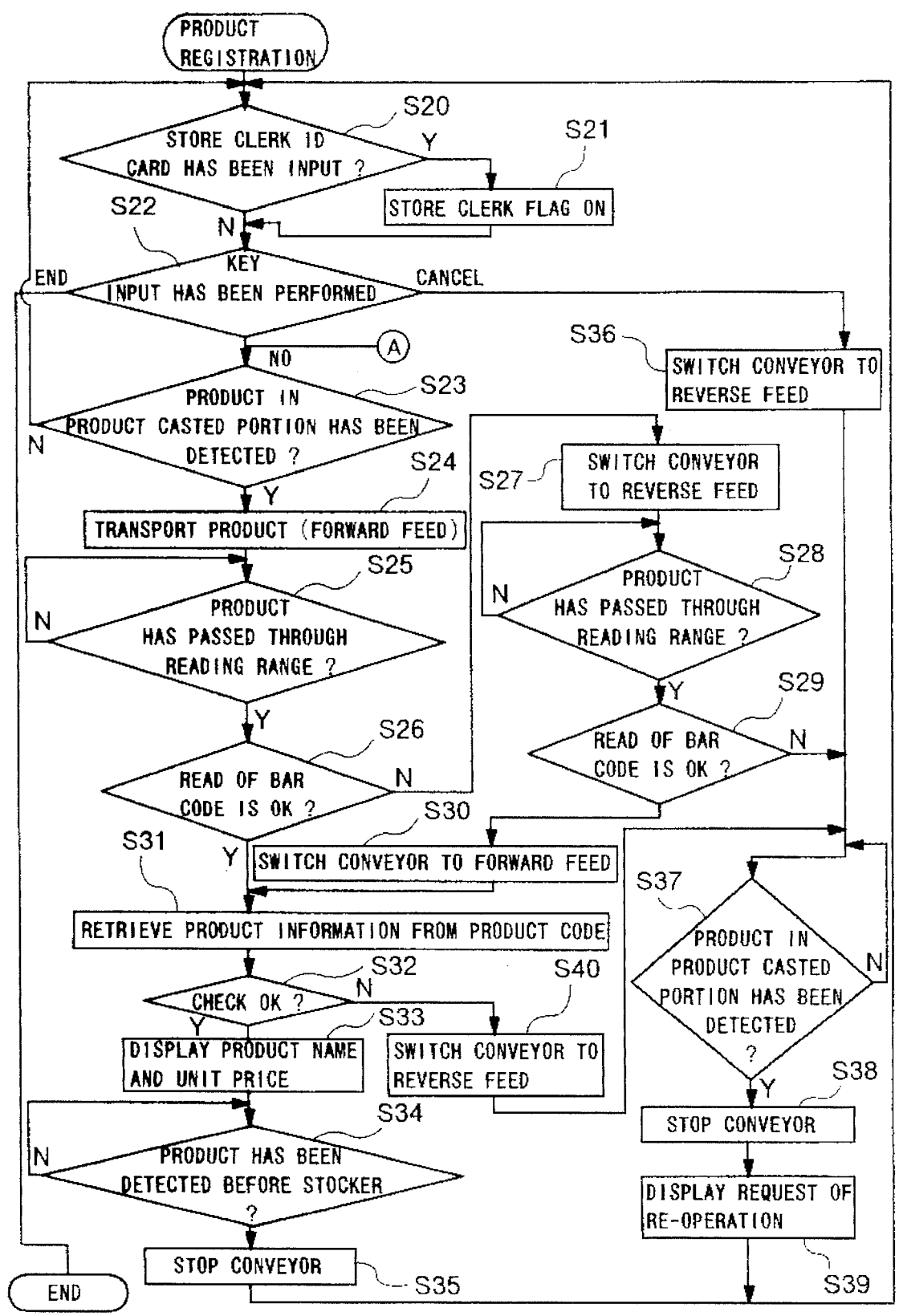
FIG. 8 is a flow chart showing a processing of registering a commercial product according to an embodiment of the present invention.

FIG. 7 is a flow chart of the whole check-out processing. FIG. 8 is a flow chart showing the details of Step S06 in FIG. 7, in particular a flow chart useful in explaining the flow of the processing containing the operation mode, as the characteristic function of the present invention, in which if the purchase has only to put the commercial product on the belt conveyor in the inlet portion (without operation of the touch scanner, the touch panel or the keyboard), all the subsequent processings which are necessary until the check-out is completed are automatically executed (hereinafter, referred to as "an automatic read mode" for short, when applicable).

Figure 9:
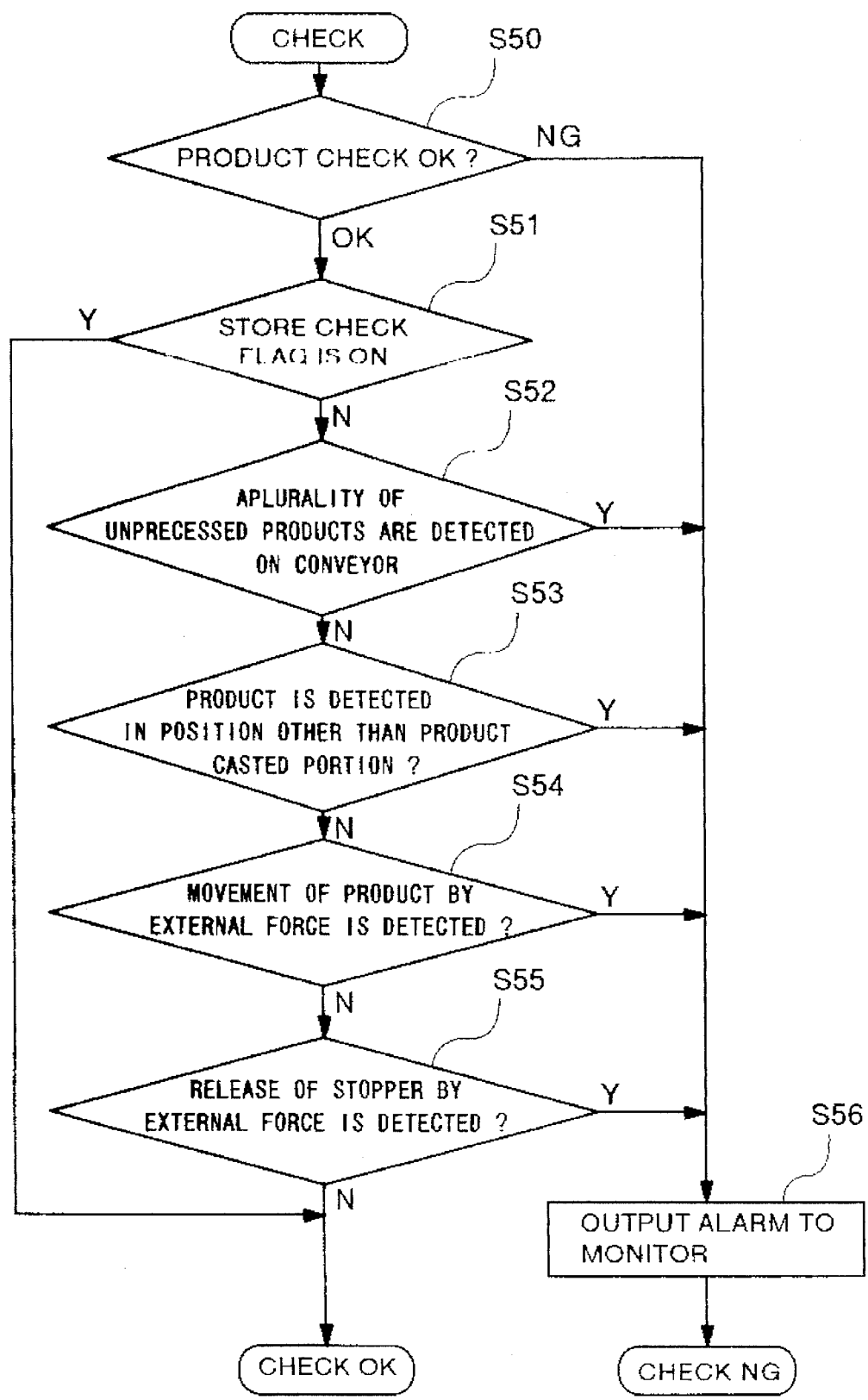
FIG. 9 is a flow chart showing a check processing according to an embodiment of the present invention.
Figure 10:
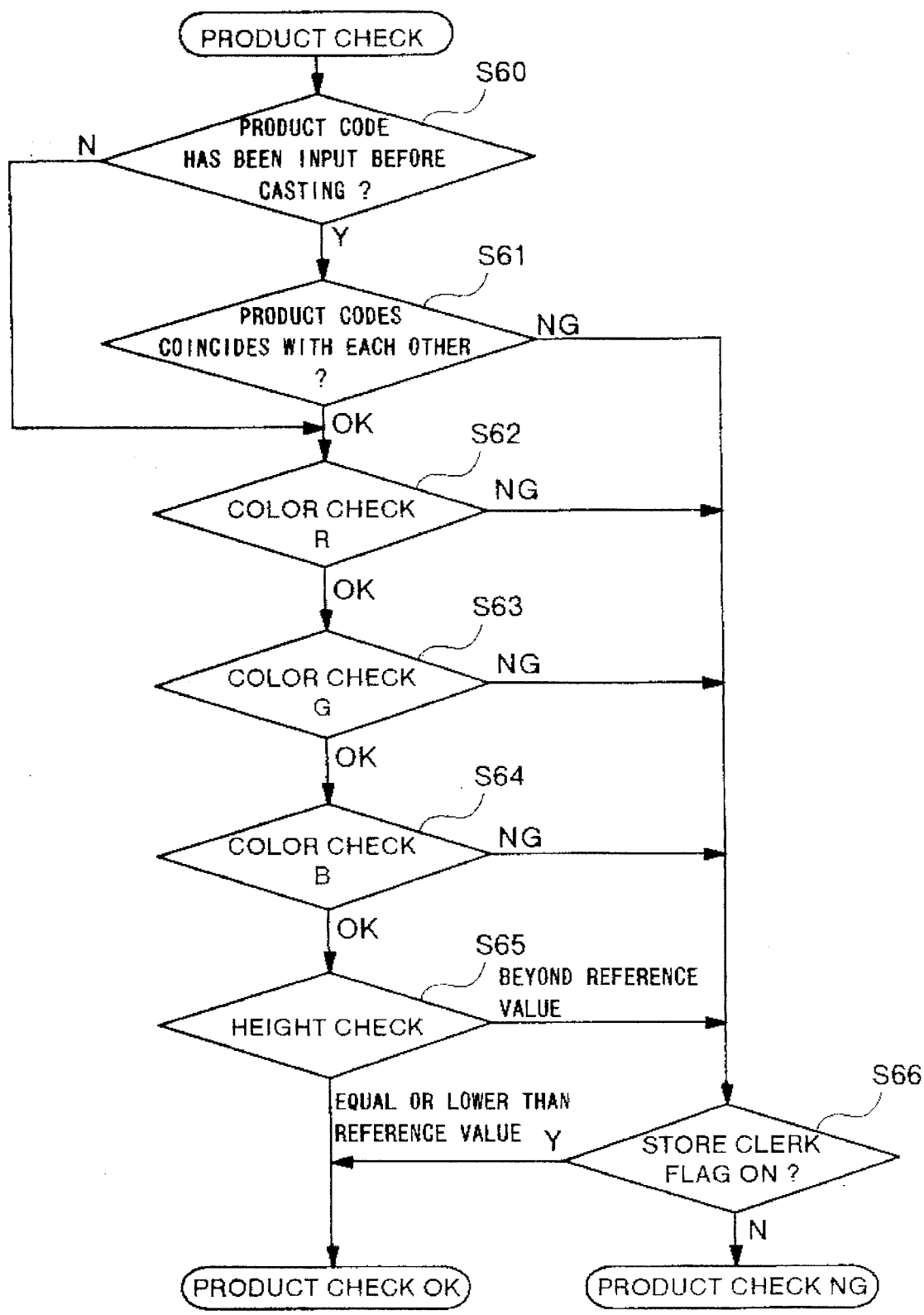
FIG. 10 is a flow chart showing a processing of checking a commercial product according to an embodiment of the present invention.

FIG. 9 is a flow chart showing the details of Step S32 in FIG. 8. FIG. 10 is a flow chart showing the details of Step S50 in FIG. 9. FIG. 11 is a flow chart showing the processing, which is obtained by modifying a part (Step S23) of the processings in FIG. 6, of an embodiment which is designed in such a way that "the above-mentioned automatic read mode", and the operation mode, in which if after the commercial product code has been read out by the operation of the touch scanner, the touch panel or the keyboard by the purchaser, the purchaser has only to put the commercial product on the belt conveyor in the inlet portion, the commercial product coincidence check (Step S61 in FIG. 10) can be performed (hereinafter, referred to as "a coincidence check mode" for short, when applicable), can be switched over to each other.

The operation will hereinbelow be described with reference to those processing flow charts. When firstly, the information stored in the membership card has been read out by the operation by the purchaser (S02 in FIG. 7), the information of the card from the card reader 4 (or 60) is read out in accordance with the control by the card reader controller 28, on the basis of the member number thereof, the member information stored in the magnetic disc 37 is retrieved (S03 in FIG. 7), and the corresponding member information is stored in a table provided in the RAM 23.

FIG. 13 is a view showing a data structure of member information. As a result, the permission degree of the commercial product check is obtained which corresponds to the information which was stored in the membership card and has been read out (S04 in FIG. 7). The permission degree of the commercial product check is corrected by the store bustling degree which was recognized by monitoring the operation spare time of the present system (S05 in FIG. 7). In the case where the information stored in the membership card was not read out (refer to a jump from S01 to S10 in FIG. 7), the permission degree of the commercial product check is determined by the store bustling degree.

When it has been detected by the commercial product sensors 8 (or 52a) that the commercial product was put on the commercial product casted portion of the belt conveyor 6 (or 51)(S23 in FIG. 8), the belt conveyor 6 (or 51) is driven in the forward direction by the conveyor controller 30 (S24 in FIG. 8) so that the commercial product is transported to the reading area of the CCD camera 7 (or the scanner 53).

When the commercial product has entered into the reading area of the CCD camera 7 (or the scanner 53), the CCD camera 7 is focused on the commercial product by the focus controller 33, and the image of the commercial product is recognized by the image recognition controller 32 (or the scanner controller 32). At this time, from the position of the focus or the recognized image of the commercial product, the height of the commercial product is recognized, and also from the image thus obtained, the detection of the commercial product bar code label and the decoding of the commercial product code are performed.

If the commercial product code in the image has been recognized and read out until the commercial product passes through the reading area, on the basis of the commercial product code thus read out, the commercial product information stored in the magnetic disc 37 is retrieved (S31 in FIG. 8), and then the commercial product information corresponding to the commercial product code of interest is stored in the table provided in the RAM 23.

FIG. 12 shows the data structure of the commercial product information. In this connection, the commercial product information consists of the commercial product name, the unit price and the check information. In addition, the check information consists of the data in which the values for the three primary colors, which are obtained by decomposing the commercial product color thereinto as the decided color data, and the data of the height of the commercial product are represented by the respective central values and allowable errors each showing the range of the dispersion.

In addition, the check data has, in addition to that decided data, the data for representing whether or not the provisional data exists, and the data for representing whether or not other decided data is registrated. The provisional data is the values which are obtained by measuring the actual commercial product by the learning function as will be described later, and also is the data which is temporarily registrated in the case where there is no decided data or the uncoincidence occurs. At the time point when a large number of values are collected, the values are reconsidered, thereby providing the decided data.

A plurality of check information is provided depending on the direction of the measurement, and the changes and the dispersion of the commercial product itself. The check information in the commercial product information is compared with the average of the data relating to the height of the commercial product and that of the data for each color component which was obtained from the image of the commercial product. As a result, it is checked whether or not the number of commercial products is one (S32 in FIG. 8, and FIGS. 9 and 10).

For example, in the case where a plurality of commercial products are arranged, since the colors of the commercial products are different from one another, or the ratio of the images of the commercial products accounting for the picture is changed, the resultant data does not coincide with the registrated data so that the commercial product(s) of interest are recognized as a plurality of commercial products. In addition, in the case where a plurality of commercial products are piled up, on the basis of checking whether or not the height is equal to or lower than the specified value, the commercial products of interest are recognized as a plurality of commercial products. The judgement method at this time depends on FIG. 5.

As described above, the processing flow of FIG. 8 shows the case of "the automatic read mode" in which the commercial product code of the commercial product is automatically read out on the belt conveyor 6 (a direct jump from S70 in FIG. 11 to S23 in FIG. 8). On the other hand, there is shown in FIG. 11 the processing flow in which to the above-mentioned case is added the case where the bar code of the commercial product is read out by manually operating the touch scanner 5 (or 61) in the operation unit, or the commercial product code is input by operating the touch panel 2 (or the keyboard 56), thereby enabling the commercial product code to be input prior to the casting.

This processing further has the two modes, i.e., "a coincidence check mode" in which after the commercial product code has been surely input, the commercial product is casted (a jump from S70 to S72 in FIG. 11), and "an automatic switching mode" in which it is automatically judged whether after input of the commercial product code, the commercial product is casted (a jump from S73 to S72 in FIG. 11), or the commercial product is directly casted without input of the commercial product code (a jump from S73 in FIG. 11 to S23 in FIG. 8).

The three modes as described above were set prior to use. For example, a mode switching switch (not shown), such as a hidden switch, which can be operated by only the store clerk, is provided, and the store clerk switches over to previously selectively one of the three modes. In the case where the commercial product code was input before casting the commercial product, the coincidence check for checking whether or not that commercial product code coincides with the commercial product code read out on the belt conveyor 6 is performed. If not, on the basis of the check, the commercial product check failure is determined (S61 in FIG. 10).

In the automatic read mode, the coincidence check for the commercial product codes (the check for coincidence of the commercial product code, which was read out by the touch panel 2 or the like before the casting the commercial product, with the commercial product code, which was read out on the belt conveyor 6 by the commercial product identifying unit (the scanner 53, CCD) is naturally performed. However, the commercial product code which was read out by the commercial product identifying unit alone is, together with other commercial product characteristic data such as the commercial product size and the color, utilized for identifying the commercial products.

Although in the above-mentioned embodiment, there is shown an example in which in accordance with the detection of the commercial product by the commercial product sensors 8, the belt conveyor 6 is started to be driven, in order to realize the present invention, such an example as to have no product sensor 8 may be available. In this case, that example can be realized on the basis of the control in which after turning the power source on, the belt conveyor 6 is always driven in the forward direction, or at the time when the operator detection sensor 63 has detected the operator, the belt conveyor 6 is started to be driven in the forward direction. Therefore, as for the control for operating the conveyor controller (the transport controlling unit) when transporting the commercial product (i.e., when transporting the commercial product from the commercial product casted portion to the product identifying unit such as the CCD camera), there are two operations, i.e., one operation for starting the conveyor, which is being stopped, to be driven in the forward direction, and the other operation for not particularly performing the operation control for the conveyor which is already driven and for maintaining the belt conveyor as it is.

In any other example other than the present embodiment, the scanner may be employed as the means for reading out the commercial product code. In addition, as the means for checking the commercial product, a transmission type sensor(s) which cross(es) the transport path of the belt conveyor 6, or a reflection type sensor(s) which is(are) provided perpendicularly to the transport path is(are) provided so that the detection of a plurality of commercial product codes in the commercial products which are transported simultaneously may be performed on the basis of the measurement of the size of the commercial products and the detection of the existence and unexistence of the gap between the commercial products, or the weight sensor(s) is(are) provided under the belt conveyor 6 so that the weight of the commercial product may be measured.

As for the checking method, in the case of the single product check for checking whether or not the number of commercial products is one, it is checked that the measured value is equal to or lower than a value which is obtained by correcting the characteristic data by the allowable error. On the other hand, in the case of the coincidence check for checking whether or not the input product code coincides with the commercial product, it is checked that the measured characteristic value of the commercial product is within the range of the allowable error of the corresponding characteristic data. In addition, in the case where the commercial product code is read out during the transport of the commercial product on the belt conveyor, the single commercial product check is used. On the other hand, in the case where after the product code has been input, the commercial product is transported, the coincidence check is used. In the case of the coincidence check, it is necessary to recognize the difference between the individual commercial products, and therefore, the allowable error therefor is made smaller than that of the single commercial product check.

In the present embodiment, the allowable error for the commercial product check is corrected by both the member information and the store bustling degree. However, in addition thereto, it may be corrected by either the unit price in the commercial product information (i.e., the allowable error is made severe as the commercial product is more expensive), or the detection of the abnormality in the commercial product check, the detection of the movement of the commercial product due to the external force (due to the purchaser's hand for example) other than the bely conveyor by the sensors 8 and the like, the detection of the commercial product located in the position other than the commercial product casted portion by the commercial product detecting sensors 8, or the detection of the release of the stopper 9, which interrupts the passage, due to the external force (the human's power or the like) applied to the stopper 9 (when those detections are obtained, it is judged that the injustice or the abnormality was made, thereby making the allowable error severer).

In the case where even when the commercial product passes through the reading area of the CCD camera 7, the commercial product code thereof can not be read out (a jump from S26 to S21 in FIG. 26), the belt conveyor 6 is fed backwardly to return the commercial product of interest up to the commercial product casted portion. The commercial product code is read out during the backward feed as well. Then, in the case where the commercial product code can be read out, the driving of the belt conveyor 6 is switched over to the forward feed (S40 in FIG. 8). This is also applicable to the case of the coincidence mode (the comparison mode) as well as the case of the automatic read mode.

In the case where the commercial product code can not be read out (a jump from S29 to S37 in FIG. 8) and in the case where the abnormality is detected by the commercial product check (a jump from S32 to S40 in FIG. 8), the commercial product of interest is returned back to the commercial product casted portion to stop the belt conveyor 6 (S38 in FIG. 8) and the display for requiring the reoperation is displayed on the display 1 (S39 in FIG. 8).

In the case where the commercial product check is normal, the registration is performed and the transport of the commercial product is stopped before the stocker 10 (S35 in FIG. 8). In addition, both the commercial product name and the price of that commercial product in the commercial product information are displayed on the display 1 (S33 in FIG. 8) Now, when the input of the cancel key has been detected by the touch panel 2 (a jump from S22 to S36 in FIG. 8), the registration is cancelled and also the belt conveyor 6 is fed backwardly (S36 in FIG. 8). Then, at the time when the commercial product has been returned back to the commercial product casted portion, the driving of the belt conveyor 6 is stopped (S38 in FIG. 8).

When the input of the end key has been detected by the touch panel 2 (S22 in FIG. 8), the registration of the commercial product is completed. In this connection, in the case of the member, the member information is updated (S07 in FIG. 7). Thereafter, the receipt is issued from the printer 3 (S08 in FIG. 7) and the lever of the stopper 9 is closed to open the passage (S09 in FIG. 7), thereby enabling the operator to go to the stocker 10.

FIG. 5 shows the registration conditions for realizing the learning function for the commercial product check and the data for the check thereof. In the check of the commercial product, in the case where the characteristic data is not registrated in the commercial product data, and in the case where a store clerk ID code is input by using the touch panel 2 when registrating the commercial product and as a result of the commercial product check, uncoincidence occurs, the recognized value is fedback as the provisional data. Then, at the time point when a plurality of coincidences are obtained, that data is decided.

In addition, in the case where uncoincidence of the checked data with the characteristic data registrated occurs by plural times, the uncoincidence data is obtained in order to look at that data periodically, thereby correcting the value of the decided data. In the case where when registrating the commercial product, the input of the store clerk ID code is detected by the touch panel 2, even if uncoincidence occurs, that data is registrated as the provisional data. As a result, the production of the commercial product characteristic data in the introduction is automatically performed.

Figure 6:
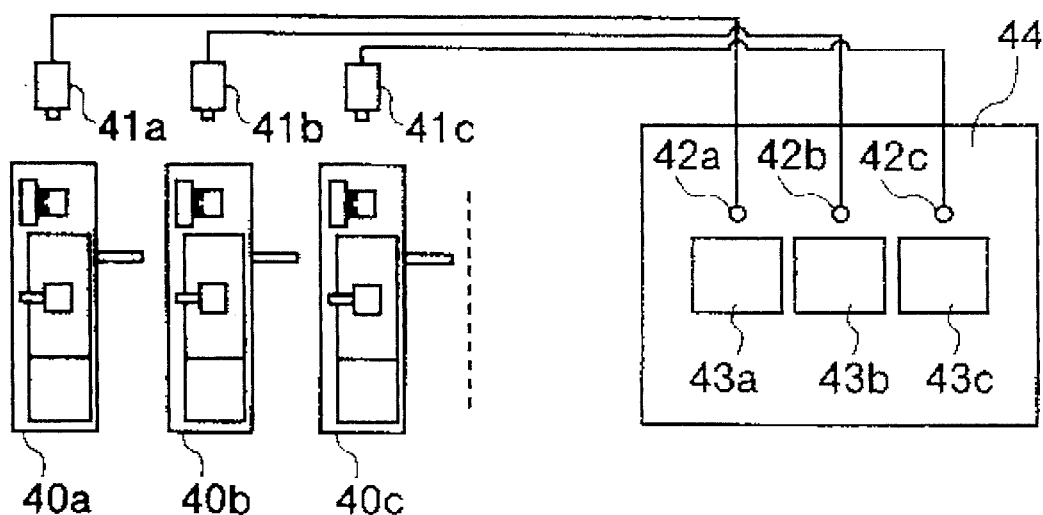
FIG. 6 is a schematic view showing an arrangement of the self check-out system and a monitor and the connection relationship therebetween.

FIG. 6 shows the connection between a self check-out system 40a and a monitor 44. In the case where it is detected by the commercial product sensors 8 in the transport unit that the commercial products are continuously casted, it is detected that the commercial product is located at the position other than the commercial product casted portion, and it is detected that the commercial product is moved by the external force other than the force by the belt conveyor 6, in the case where in a state in which the stopper 9 interrupts the passage by the operation of the stopper controller, it is detected that the stopper 9 is released by applying the external force to the stopper 9, and in the case where the uncoincidence is detected when checking the commercial product, an alarm signal is output to the monitor 44 which performs the monitoring through a mounting camera 41a. The monitoring person can readily detect both the abnormality and the injustice by observing a monitoring device 43a with an alarm lamp 42 closely.

Figure 14:
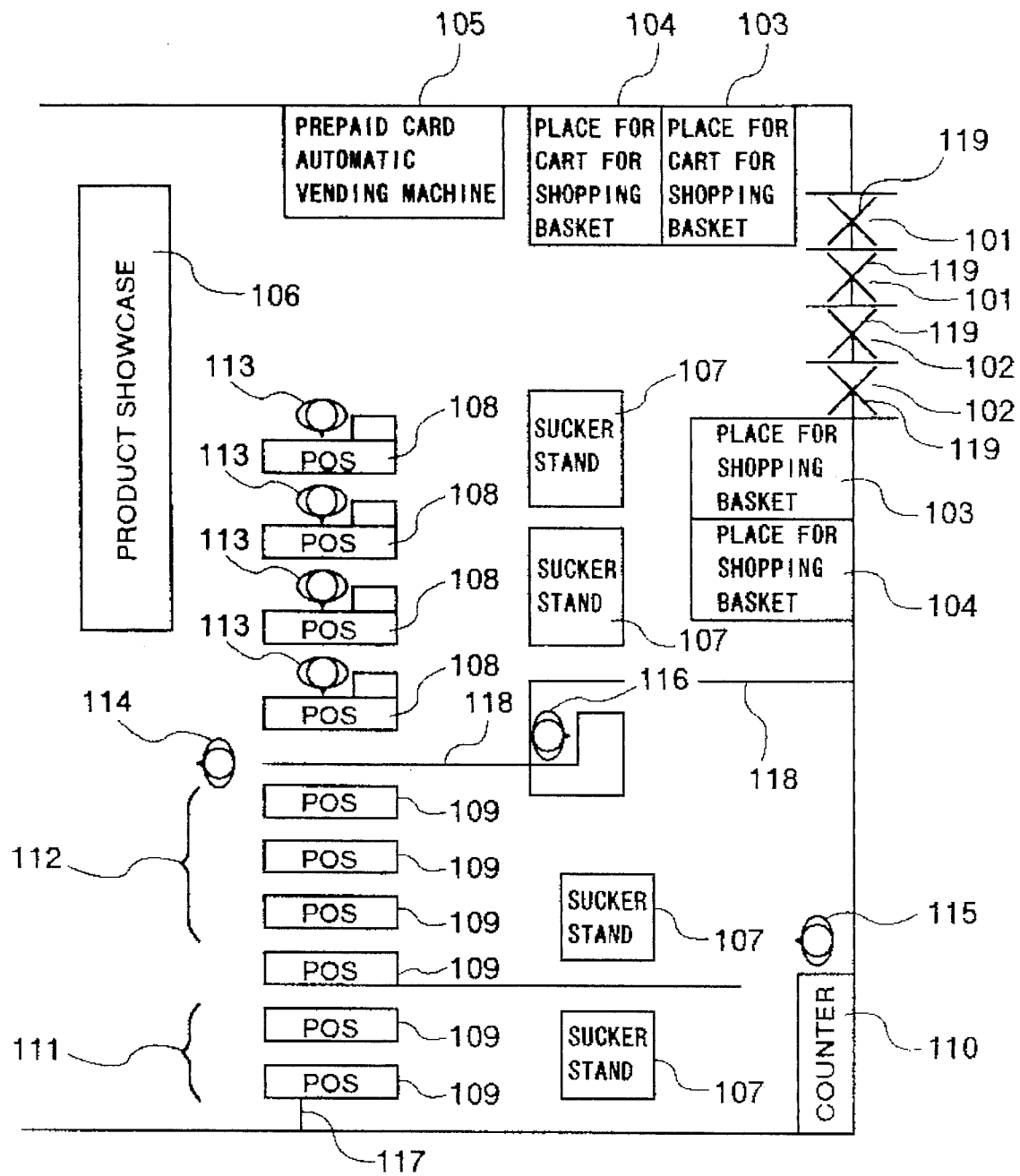
FIG. 14 is a schematic view showing a store layout according to an embodiment of the present invention.

FIG. 14 is a schematic view showing a store layout into which the POS system of the embodiment of the present invention is introduced. In the figure, reference numeral 101 designates an entrance; reference numeral 102 designates an exit; reference numeral 103 designates a place for shopping baskets; reference numeral 104 designates a place for carts for shopping baskets; reference numeral 105 designates a prepaid card automatic vending machine; reference numeral 106 designates a commercial product show case; reference numeral 107 designates a sucker stand; reference numeral 108 designates a POS system of a checker operation type which is operated by the store clerk; reference numeral 109 designates a self check-out system which is operated by the purchaser; reference numeral 110, a reception counter for paying the cash; reference numeral 111, a set of self check-out systems 109 for the purchasers who will pay the cash; reference numeral 112, a set of self check-out systems 109 for the purchasers who will perform the payment by the respective cards; reference numeral 113, a checker; reference numeral 114, an area for the store clerk(s) who will guide the associated purchaser(s) to explain the operation of the self check-out system 109; reference numeral 115, an area for the store clerk(s) who will guide the associated purchaser(s) to the reception counter for paying the cash; 116, a general guide store clerk area for the self check-out system 109; 117, a pause state compartment of the self check-out system 109; 118, a chain type compartment; and 119, a one-way type door.

Figure 15:
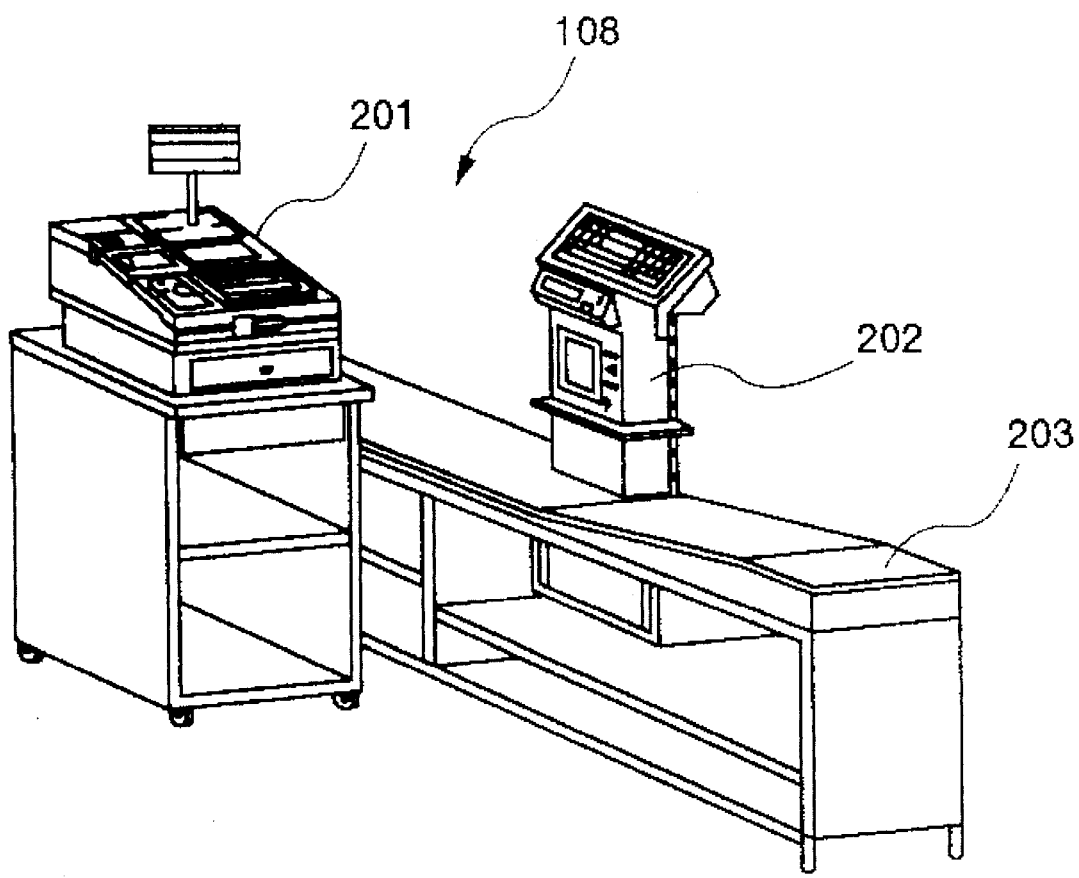
FIG. 15 is a perspective view showing construction of a POS system of a checker operation type according to an embodiment of the present invention.

FIG. 15 is a perspective view showing one example of the POS system 108 of a checker operation type which is shown in FIG. 14 and is operated by the store clerk. In the figure, reference numeral 201 designates a unit for paying the price for the purchaser which is included in the POS system 108 of a checker operation type, reference numeral 202 designates a unit for registering the commercial product which is included in the POS system of a checker operation type, and reference numeral 203 designates a counter of the POS system of a checker operation type.

Figure 16:
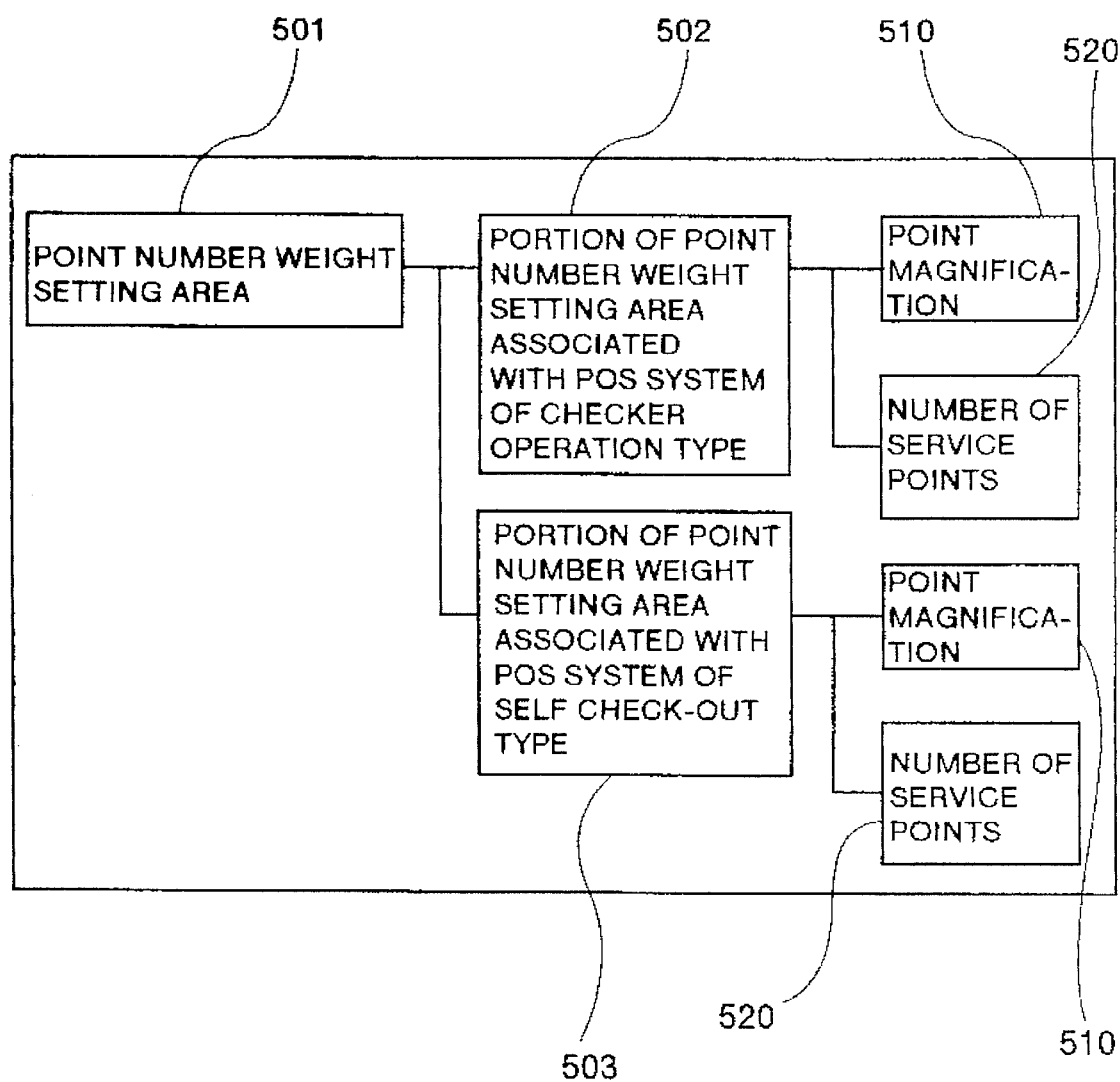
FIG. 16 is an item association view showing an area, in which the weight of the point marks is set, within a storage unit of a POS system according to an embodiment of the present invention.

FIG. 16 is an item association view showing a point number weight setting area within a storage unit 405 (the magnetic disc 37, the ROM 22 and the RAM 23 are generally known as the storage unit) of the POS system 108 of a checker operation type, or an item association view showing a point number weight setting area within the storage unit 405 of the self check-out system 109.

In the figure, reference numeral 501 designates a point number weight setting area in the item association view of the point number weight setting area, reference numeral 502 designates a portion, of the point number weight setting area 501, associated with the POS system of a checker operation type, reference numeral 503 designates a portion, of the point number weight setting area 501, associated with the self check-out system, reference numeral 510 designates a point magnification of the point number weight setting area 501, and reference numeral 520 designates the number of service points of the point number weight setting area 501. This point magnification 510 is the rate of the number of service points which are given for a fixed sum for the purchaser. For example, the point magnification is such that one point is given for 300 yen (the magnification is 1/200).

Figure 17:
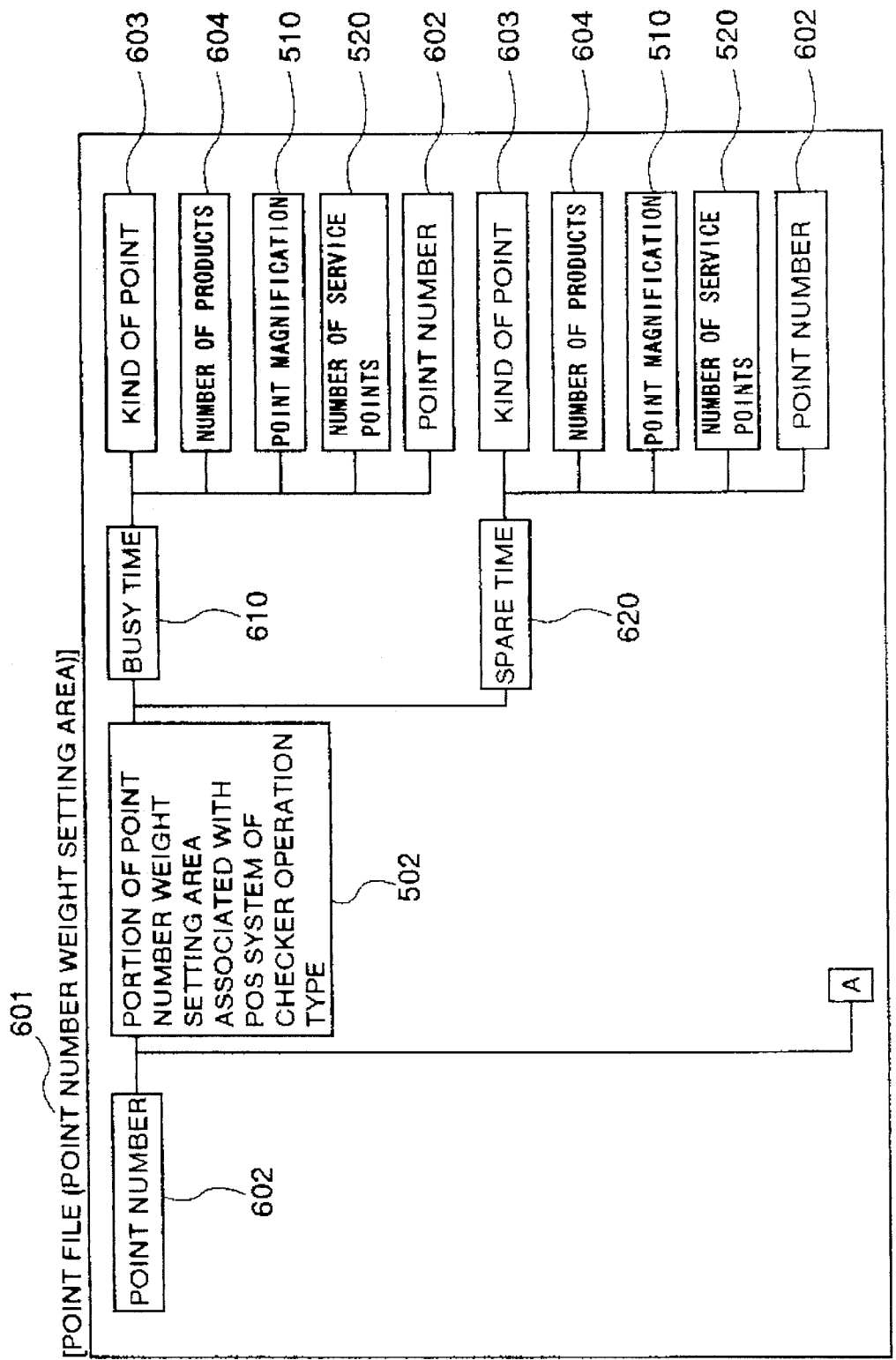
FIG. 17 is a schematic view relating to items of a point file within the storage unit of the POS system according to an embodiment of the present invention.
Figure 18:
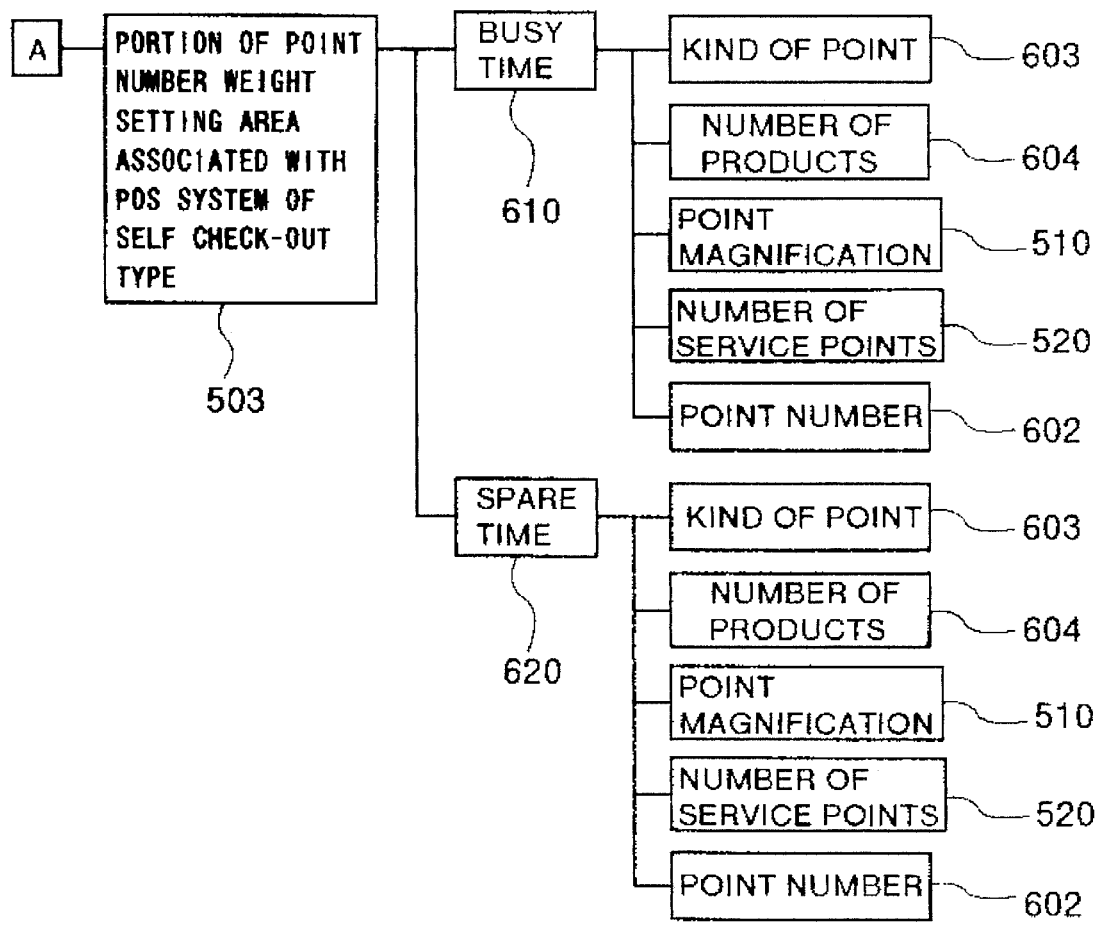
FIG. 18 is a schematic view relating to items of a point file within the storage unit of the POS system according to an embodiment of the present invention.

FIG. 17 or 18 is an item association view 601 of a point file which is obtained by extending the item association view of the point number weight setting area within a storage unit (not shown) provided in the POS system 108 of a checker operation type, or an item association view 601 of a point file which is obtained by extending the item association view of the point number weight setting area within the storage unit of the self check-out system 109.

Reference numeral 602 designates a point number (corresponding to the commercial product) of a point file 601, reference numeral 610 designates busy time of the point file 601, reference numeral 620 designates spare time of the point file 601, reference numeral 603 designates a kind of point of the point file 601, and reference numeral 604 designates the number of commercial products of the point file 601.

Figure 19:
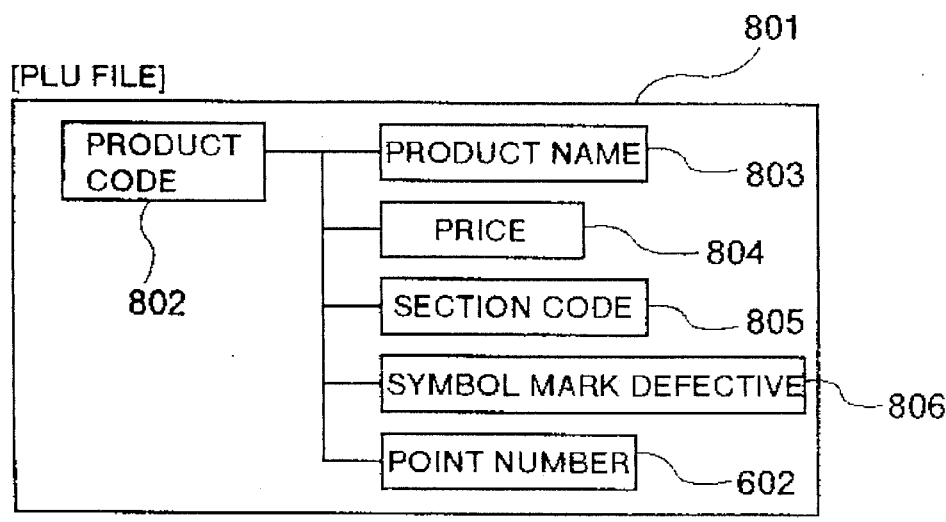
FIG. 19 is a schematic view relating to items of a PLU file within the storage unit of the POS system according to an embodiment of the present invention.

FIG. 19 is an item association view 801 of a PLU file within the storage unit of the POS system 108 of a checker operation type, or an item association view 801 of a PLU file within the storage unit 405 of the self check-out system 109. In the figure, reference numeral 802 designates a commercial product code for identifying the associated commercial product, reference numeral 803 designates a commercial product name corresponding to the commercial product code 802, reference numeral 804 designates a price corresponding to the commercial product code 802, reference numeral 805 designates a section code corresponding to the commercial product code 802, and reference numeral 806 designates symbol mark defective information corresponding to the commercial product code 802.

Figure 20:
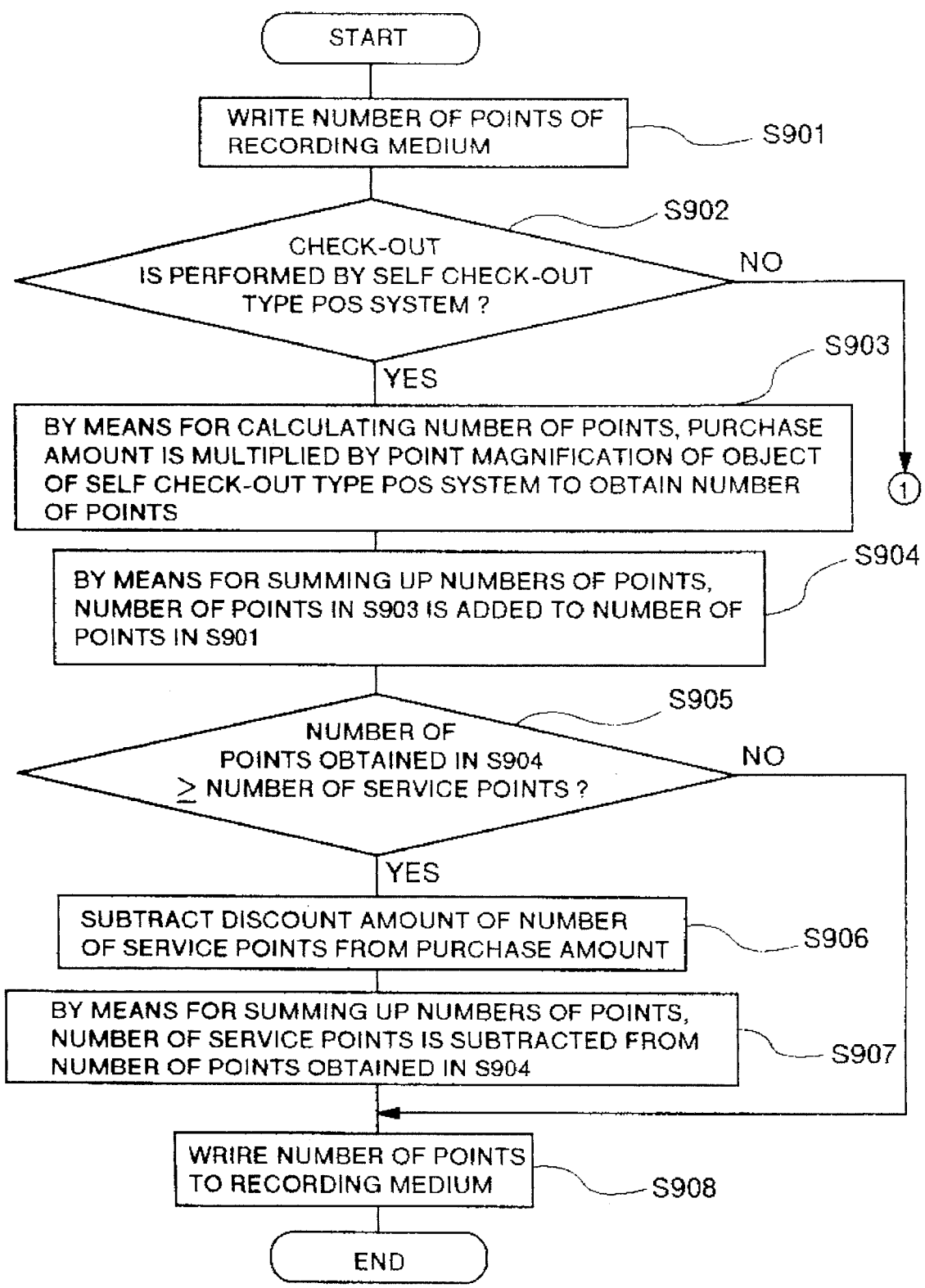
FIG. 20 is a flow chart showing a method of calculating the point marks in units of a purchase amount in a POS point service system according to an embodiment of the present invention.
Figure 21:
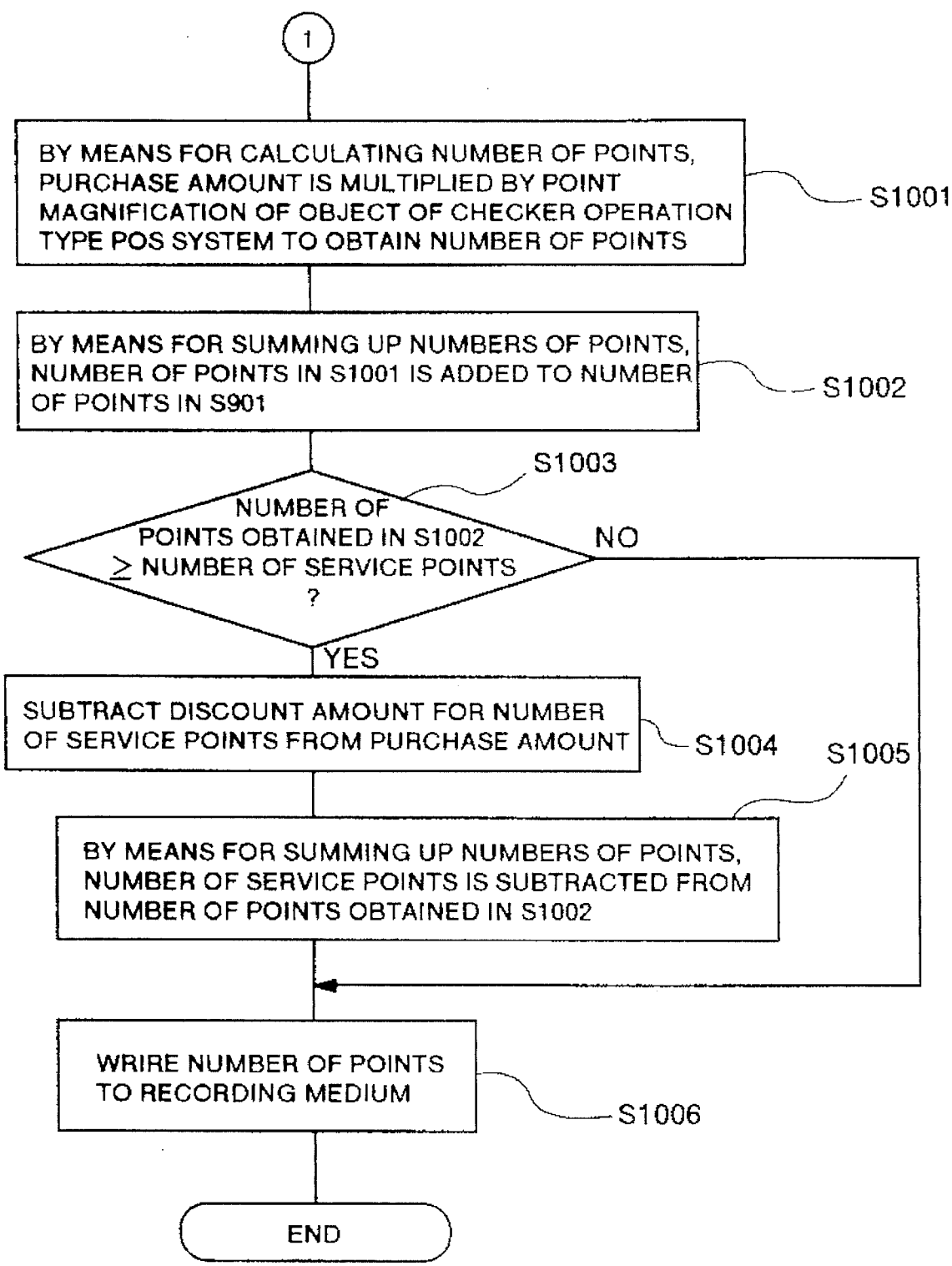
FIG. 21 is a flow chart showing a method of calculating the point marks in units of a purchase amount in a POS point service system according to an embodiment of the present invention.

Next, the description will hereinbelow be given with respect to an embodiment of the point number system in units of a purchased sum as the price of the commercial products which are purchased by the purchaser as the consumer in the case where in both the POS system 108 of a checker operation type and the self check-out system 109, the check-out is performed, with reference to flow charts of FIGS. 20 and 21, and the item association view of the point number weight setting area of FIG. 16.

Now, the system which is a general term of the above-mentioned POS system 108 of a checker operation type and the above-mentioned self check-out system 109 is simply defined as the POS system.

In addition, for certain reasons, the description will be given with the above-mentioned CPU 21 divided into a control unit 401 and a calculation unit 402.

The purchaser as the consumer presents a recording medium, in which the data relating to the number of points is recorded, in the check-out. Now, the recording medium may be a magnetic card, a prepaid card, an IC card, a noncontact type card or the like as long as it is capable of recording the data therein. The recording medium is, in the case of the POS system 108 of a checker operation type, handed over to the associated checker, and then that checker inserts the recording medium into the recording medium read/write device as the device for reading/writing the data from/to the recording medium. On the other hand, in the case of the self check-out system 109, the purchaser as the consumer inserts directly the recording medium into the above-mentioned recording medium read/write device. Now, the above-mentioned recording medium read/write device may be the magnetic card reader/writer 28* or the like as long as it concurs with the recording medium.

When the recording medium has been inserted into the recording medium read/write device, in the POS system, the data relating to the number of points in the recording medium is written to the storage unit (ROM 22, RAM 23) by the control unit (CPU 21) (S901).

If the POS system is a self check-out system 109 (S902), by means for calculating the number of points provided in a control unit of the self check-out system 109, the purchase amount of the check-out is multiplied by the point magnification 510 of the portion 503, of the point number weight setting area 501, associated with the POS system of a self check-out type, within a storage unit (ROM 22, RAM 23) of the self check-out system 109 to obtain the number of points (S903).

By means for summing up the numbers of points, the number of points in Step S903 is added to the number of points in Step S901 to store the resultant data relating thereto in the storage unit (ROM 22, RAM 23) of the self check-out system 109 (S904).

In the case where the number of points which has been obtained in Step S904 is equal to or larger than the number of service points 520 of the portion 503 of the point number weight setting area 501, associated with the self check-out system, within the storage unit of the self check-out system 109 (S905), the amount corresponding to the number of service points is subtracted from the purchase amount (S906). Now, the amount to be subtracted may be the number of service points itself. In the case where the subtraction is not performed, the service ticket(s) which can be used as the gold note(s) in the future may be issued to the purchaser as the consumer.

By the means for summing up the numbers of points, the number of service points 520 of the portion 503, of the point number weight setting area 501, associated with the self check-out system, within the storage unit of the self check-out system 109 is subtracted from the number of points which has been obtained in Step S904 to store the resultant data in the storage unit 405 of the self check-out system 109 (S907).

In Step S905, in the case where the number of points which has been obtained in Step S904 is lower than the number of service points 520 of the portion 503, of the point number weight setting area 501, associated with the self check-out system, within the storage unit 405 of the self check-out system 109, both Steps S906 and S907 are skipped over to Step S908.

The self check-out system 109 writes the data relating to the number of points which has been stored in the storage unit 405 of the self check-out system 109 is written to the above-mentioned recording medium by operation of the control unit 401 and the recording medium read/write device (S908).

If in Step S902, the POS system of interest is the POS system 108 of a checker operation type, by the means for calculating the number of points of the calculation unit 402 within the control unit 401 of the POS system 108 of a checker operation type, the purchase amount of the check-out of interest is multiplied by the point magnification 510 of the portion 502, of the point number weight setting area 501, associated with the POS system of a checker operation type, within the storage unit 405 of the POS system 108 of a checker operation type, thereby obtaining the number of points (S1001).

By the means for summing up the numbers of points, the number of points in Step S1001 is added to the number of points in Step S901 to store the resultant data in the storage unit 405 of the POS system 108 of a checker operation type (S1002).

In the case where the number of points which has been obtained in Step S1002 is equal to or larger than the number of service points 520 of the portion 502, of the point number weight setting area 501, associated with the POS system of a checker operation type, within the storage unit 405 of the POS system 108 of a checker operation type (S1003), the amount for the number of service points is subtracted from the purchase amount (S1004). Now, the amount to be subtracted may be the number of service points itself. In the case where the subtraction is not performed, the service ticket(s) which can be used as the gold note(s) in the future may be issued to the purchaser as the consumer.

By the means for summing up the numbers of points, the number of service points 520 of the portion 503, of the point number weight setting area 501, associated with the POS system of a checker operation type, within the storage unit 405 of the POS system 108 of a checker operation type is subtracted from the number of points which has been obtained in Step S1002, thereby storing the resultant data in the storage unit 405 of the POS system 108 of a checker operation type (S1005).

In the case where in Step S1003, the number of points which has been obtained in Step S1002 is lower than the number of service points 520 of the portion 502, of the point number weight setting area 501, associated with the POS system of a checker operation type, within the storage unit 405 of the POS system 108 of a checker operation type, both Steps S1004 and S1005 are skipped over to Step S1006.

The POS system 108 of a checker operation type writes the data relating to the number of points which has been stored in the storage unit 405 of the POS system 108 of a checker operation type to the above-mentioned recording medium by the operation of the control unit 401 and the recording medium read/write device (S1006).

In the above-mentioned embodiment, the number of points is calculated by the point number calculating means of the POS system. However, a point adding key using which the checker who operates the POS system can input the number of points is provided on the keyboard 26\* of the POS system, whereby the arbitrary number of points can be given to the purchaser as the consumer.

Figure 22:
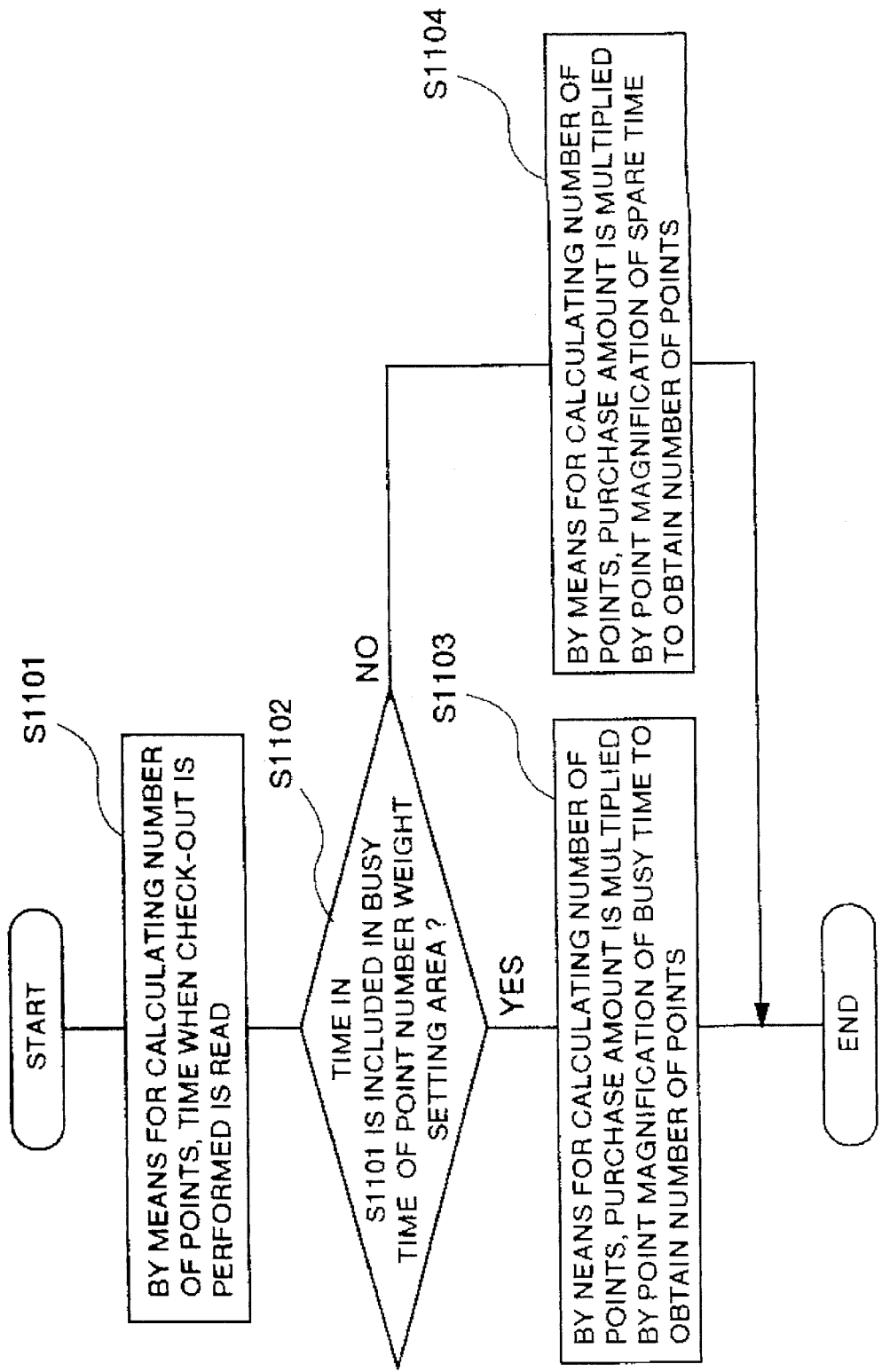
FIG. 22 is a flow chart showing a method of calculating the point marks, in which it is realized that the point scale factors are different from each other, in the POS point service system according to an embodiment of the present invention.

Next, the description will hereinbelow be given with respect to an embodiment of calculating the number of points, in which it is realized that the point magnification for the purchase amount as the prices of the commercial products which are purchased by the purchaser as the consumer are different from each other depending on the store conduct time zone, with reference to a flow chart of FIG. 22, the item association view of the point number weight setting area of FIG. 16, the association view shown in FIG. 17 to which the busy time 610 and the spare time 620 are added, or the point file item association view 601 of FIG. 17.

By the means for calculating the number of points of the calculation unit 402 provided in the control unit 401 of the above-mentioned POS system, the data relating to the time of the check-out of interest is written by the operation of a clock function (not shown) (S1101). If the time in Step S1101 is contained in the time zone of the busy time 610 of the item association view of the point number weight setting area (S 1102), by the means for calculating the number of points of the calculation unit 402 provided in the control unit 401 of the POS system, the purchase amount of the check-out of interest is multiplied by the point magnification 510 of the busy time 610 of the point number weight setting area 501 within the storage unit 405 of the POS system, thereby obtaining the number of points (S1103).

In addition, if the time in Step S1101 is contained in the time zone of the spare time 620 of the item association view of the point number weight setting area (S1102), by the means for calculating the number of points of the calculation unit 402 provided in the control unit 401 of the POS system, the purchase amount of the check-out of interest is multiplied by the point magnification 510 of the spare time 620 of the point number weight setting area 501 within the storage unit 405 of the POS system, thereby obtaining the number of points (S1104).

Although in the above-mentioned embodiment, the two time zones of the busy time and the spare time are set, a plurality of arbitrary time zones may be available. As a result, the finer point service system becomes possible.

Figure 23:
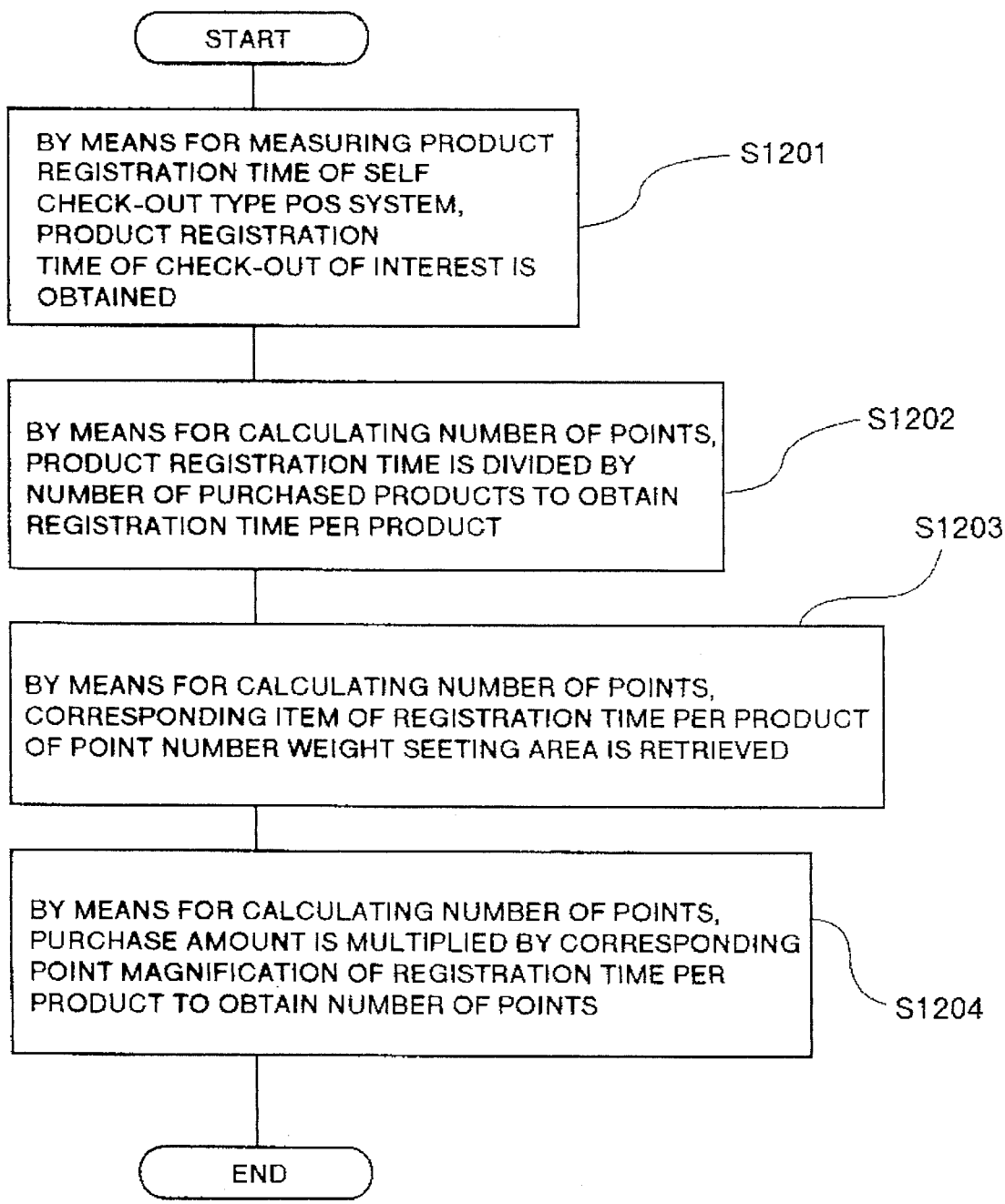
FIG. 23 is a flow chart showing a method of calculating the point marks in accordance with commercial product registration time in the self check-out system of the POS point service system according to an embodiment of the present invention.

Next, the description will hereinbelow be given with respect to an embodiment of calculating the number of points in accordance with the commercial product registration time of the check-out which was performed using the self check-out system 109 by the purchaser as the consumer with reference to a flow chart of FIG. 23, an association view in which both the item of the registration time per commercial product and the item of the point magnification 510 corresponding thereto are added to the item association view of the point number weight setting area shown in FIG. 16, and the item association view 801 of the PLU file shown in FIG. 19.

By means for measuring the commercial product registration time of the calculation unit 402 provided in the control unit 401 of the self check-out system 109, the commercial product registration time of the check-out of interset is measured (S1201). At this time, in the case where the commercial product code, to which in symbol mark defective information 806 is added, is contained in the commercial product registration time of the check-out, the registration time for the commercial product code to which the above-mentioned symbol mark defective information 806 is added may be subtracted from the above-mentioned commercial product registration time. Then, by the means for calculating the number of points of the calculation unit 402 provided in the control unit 401 of the self check-out system 109, the above-mentioned commercial product registration time is divided by the number of purchased commercial products, thereby obtaining the registration time per commercial product (S1202).

By the means for calculating the number of points of the calculation unit 402 in the control unit 401 of the above-mentioned self check-out system 109, the corresponding item of the registration time per commercial product of the item association view of the point number weight setting area is retrieved (S1203).

By the means for calculating the number of points of the calculation unit 402 in the control unit 401 of the above-mentioned self check-out system 109, the purchase amount is multiplied by the corresponding point magnification 510 of the registration time per commercial product to obtain the number of points (S1204).

Figure 24:
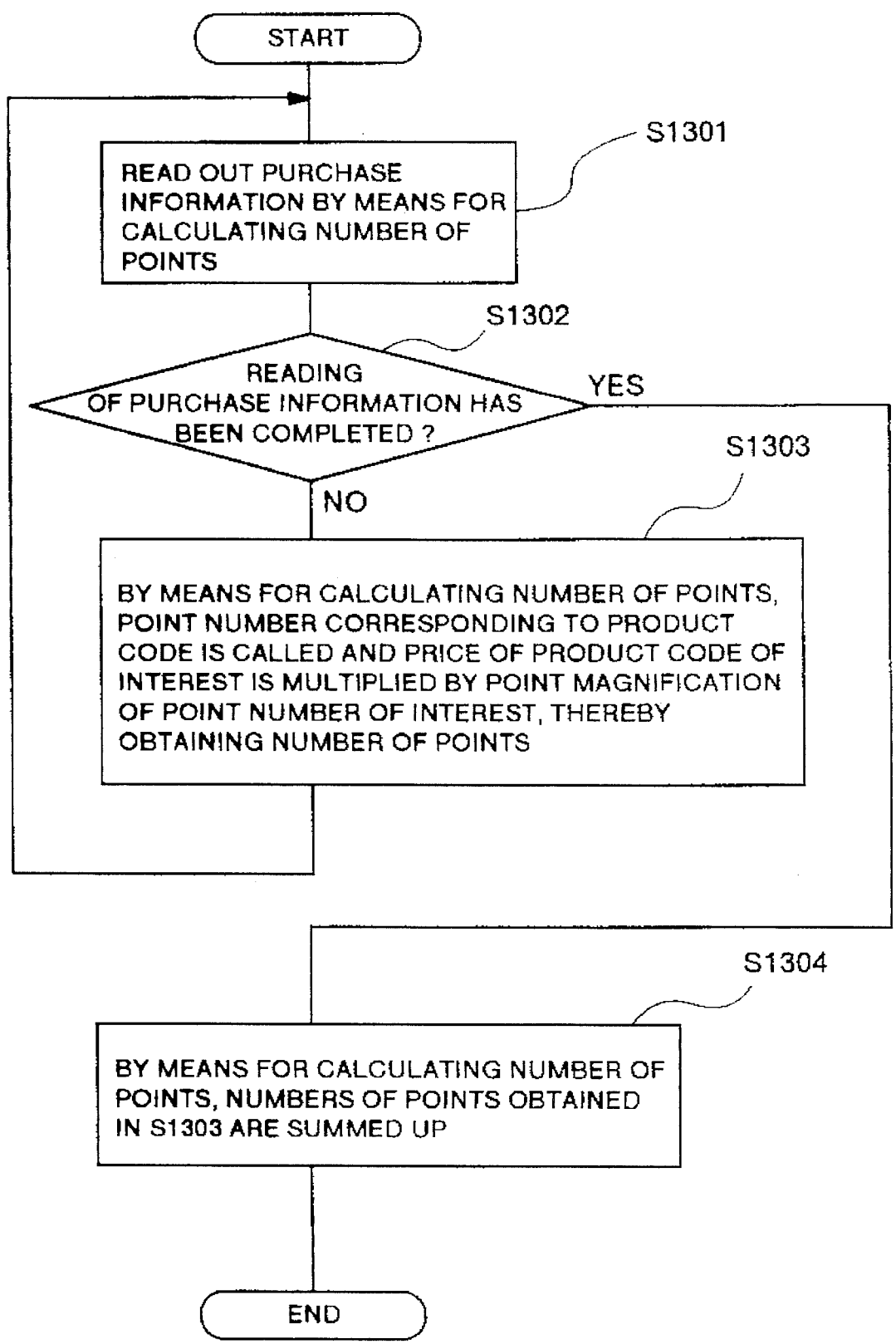
FIG. 24 is a flow chart showing a method of calculating the point marks in units of a commercial product in the POS point service system according to an embodiment of the present invention.

Finally, the description will hereinbelow be given with respect to an embodiment of calculating the number of points in accordance with the units of commercial products which were purchased by the purchaser as the consumer, with reference to a flow chart of FIG. 24, the item association view 601 of the point file which is obtained by extending the item association view of the point number weight setting area in the storage unit 405 of the POS system shown in FIG. 17, and the item association view 801 of the PLU file in the storage unit 405 of the POS system.

By the means for calculating the number of points of the calculation unit 402 in the control unit 401 of the POS system, the purchase information, corresponding to the commercial product codes, such as the commercial products, which are purchased by the check-out, and the numbers thereof, is read out during the payment registration (S1301). Then, by the means for calculating the number of points of the calculation unit 402 in the control unit 401 of the POS system, the data relating to the point number 602 corresponding to the commercial product code 802 is read out from the point file 601, and then the price 804 of the commercial product code 802 is multiplied by the point magnification 510 of the point number 602 of interest, thereby obtaining the numbers of points of the individual commercial products (S1303). At the time when the read of the purchase information has been completed (S1302), by the means for calculating the number of points of the calculation unit 402 in the control unit 401 of the POS system, the numbers of points which have been obtained in Step S1303 are summed up (S1304).

It is to be understood that although in the above-mentioned embodiments, the number of points are calculated for the fine commercial product units, even in the case of the marketing by the section code input, the same processings can be executed.

In addition, in the above-mentioned embodiments, the numbers of commercial products are calculated for the individual commercial products. However, the kind of points 603, in the point file 601, corresponding to the above-mentioned point number 602, the number of commercial products 604 of the point file and the point magnification 510 are set step by step, and the point file is read out from the point file (for example, in FIG. 17, if the point number 602 of the top left and the point number 602 of the right side are made the point numbers of the different commercial products associated with each other, from one commercial product point number, the other commercial product point number associated therewith can be called, and therefore), whereby the finer point number calculation based on the arbitrary combination of different commercial products purchased can be performed.

What is claimed is:

1. A check-out system comprising:

a portion into which a commercial product is casted;

a stocker for stocking the commercial products;

a transport path for transporting the commercial product from said commercial product casted portion to said stocker;

a commercial product identifying unit located between said commercial product casted portion and said stocker for providing an identification result identifying whether or not the commercial product transported from said commercial product casted portion is to be transported up to said stocker;

a commercial product code inputting unit for inputting a commercial product code of the commercial product in said commercial product casted portion;

a commercial product code reading unit for reading out the commercial product code of the commercial product code of the commercial product in said commercial product identifying unit; and a transport controlling unit for sensing whether a commercial product is put on said transport path before inputting said commercial product code into said commercial product code inputting unit and for starting to move the operation of said transport path, said transport controlling unit having means for selecting a first mode where the commercial product is sensed to be put on said transport path in said commercial product casted portion before inputting a commercial product code in said commercial product code inputting unit to move said transport path and in accordance with the identification result provided by said commercial product identifying unit, the commercial product is selectively transported to either said stocker or said commercial product casted portion, and selecting a second mode where the commercial product code has been first sensed to be input by a user through said commercial product code inputting unit before sensing said commercial product being put on said transport path by said transport controlling unit, and in accordance with a comparison between said commercial product code and the identification result provided by said commercial product identifying unit, the commercial product is selectively transported to either said stocker or said commercial product casted portion.

2. A check-out system according to claim 1, wherein said commercial product identifying unit operates to utilize whether or not in the first mode, the commercial product code is read out by said commercial product code reading unit, as the identification of the commercial product, for performing the transport control.

3. A check-out system according to claim 2, wherein said commercial product identifying unit operates to identify, in the case where in the first mode, the commercial product code can not be read out by said commercial product code reading unit, the commercial product of interest as the commercial product to be returned back to said commercial product casted portion.

4. A check-out system according to claim 1, wherein said commercial product identifying unit operates to utilize, in the second mode, the result of comparing the commercial product code input by said commercial product code inputting unit and the commercial product code read out by said commercial product code reading unit with each other for identifying the commercial products.

5. A check-out system according to claim 1, further comprising:
a commercial product number checking unit for checking the number of commercial products put on said transport path,
wherein said commercial product identifying unit operates to utilize the check result provided by said commercial product number checking unit for identifying the commercial products.

6. A check-out system according to claim 5, wherein said commercial product number checking unit is composed of a plurality of sensors which are installed along said transport path.

7. A check-out system according to claim 5, wherein said commercial product identifying unit operates to identify, in the case where the plurality of commercial products are detected by said commercial product number checking unit, the commercial products of interest as the commercial products to be returned back to said commercial product casted portion.

8. A check-out system according to claim 1, further comprising:
a commercial product number checking unit for checking the number of commercial products put on said transport path,
wherein said commercial product identifying unit operates to utilize the check result provided by said commercial product number checking unit for identifying the commercial products.

9. A check-out system according to claim 1, further comprising:
a storage unit for holding a correspondence table for storing the data relating to the correspondence relationship between the commercial product codes, and characteristic data of the commercial products and an allowable error range of the characteristic data;
a measurement unit for measuring the characteristic data of the commercial product in said commercial product identifying unit;
an operation unit for inputting an operation mode of said check-out system; and
a unit for checking the coincidence with respect to the commercial product,
wherein said commercial product coincidence checking unit operates to compare, when the operation mode of interset is the first mode, the measured values provided by said measurement unit and the characteristic data in said table with each other to calculate an error and store the calculated values as the allowable error range in said table, and to compare, when the operation mode of interest is the second operation mode, the measured values provided by said measurement unit and the characteristic data in said table with each other to calculate an error and check whether or not the calculated value is within the allowable error range in said table to utilize the checked result for identifying the commercial products.

10. A check-out system according to claim 9, wherein said commercial product coincidence checking unit operates to check, when the operation of interest is the first operation mode, whether or not the commercial product characteristic data corresponding to the commercial product code input to said table is registered, and store, in the case where the commercial product characteristic data is not registered, the calculated error as the allowable error range.

11. A check-out system according to claim 9, wherein said commercial product coincidence checking unit operates to check, when the operation of interest is the first operation mode, whether or not the commercial product characteristic data corresponding to the commercial product code input to said table is registered, and compare, in the case where the commercial product characteristic data is registered, the value of the calculated error and the allowable error range stored with each other, and store, in the case where the value of the calculated error is beyond the allowable error range, the calculated error as the allowable error range.

12. A check-out system according to claim 1, further comprising:
a photographing unit for monitoring the operation of an operator;
a projection unit for projecting the photographing contents provided by said photographing unit;
an abnormality or injustice detecting unit for detecting abnormality or injustice of the operation; and
means for outputting, when the abnormality or injustice of the operation is detected, an alarm signal to said projection unit.

13. A check-out system comprising:
a portion into which a commercial product is casted;
a stocker for stocking the commercial products;
a transport path for transporting the commercial product from said commercial product casted portion to said stocker;
a commercial product identifying unit located between said commercial product casted portion and said stocker for providing an identification result identifying whether or not the commercial product transported from said commercial product casted portion is to be transported up to said stocker;
a commercial product code inputting unit for inputted a commercial product code of the commercial product in said commercial product casted portion;
a commercial product code reading unit for reading out the commercial product code of the commercial product code of the commercial product in said commercial product identifying unit; and
a transport controlling unit for controlling the operation of said transport path,
said transport controlling unit having a first mode in which the commercial product put on said transport path in said commercial product casted portion is transported and in accordance with the identification result provided by said commercial product identifying unit, the commercial product is selectively transported to either said stocker or said commercial product casted portion, and a second mode in which after the commercial product code has been input by a user through said commercial product code inputting unit, and commercial product put on said transport path is transported, and in accordance with the identification result provided by said commercial product identifying unit, the commercial product is selectively transported to either said stocker or said commercial product casted portion, wherein either one of said first and second modes is selected based on a condition whether the commercial product code is inputted by the user when the commercial product is put on said casted portion; wherein said check-out system further comprises:

a manual mode switching unit for selectively switching between the first and second modes prior to operation, wherein said transport controlling unit operates to perform the transport control with the mode specified by said manual mode switching unit.

14. A check-out system according to claim 13, wherein said commercial product identifying unit operates to utilize whether or not in the first mode, the commercial product code is read out by said commercial product code reading unit, as the identification of the commercial product, for performing the transport control.

15. A check-out system according to claim 14, wherein said commercial product identifying unit operates to identify, in the case where in the first mode, the commercial product code cannot be read out by said commercial product code reading unit, the commercial product of interest as the commercial product to be returned back to said commercial product casted portion.

16. A check-out system according to claim 13, wherein said commercial product identifying unit operates to utilize, in the second mode, the result of comparing the commercial product code input by said commercial product code inputting unit and the commercial product code read out by said commercial product code reading unit with each other for identifying the commercial products.

17. A check-out system according to claim 13, further comprising:

a commercial product number checking unit for checking he number of commercial products put on said transport path, wherein said commercial product identifying unit operates to utilize the check result provided by said commercial product number checking unit for identifying the commercial products.

18. A check-out system according to claim 17, wherein said commercial product number checking unit is composed of a plurality of sensors which are installed along said transport path.

19. A check-out system according to claim 17, wherein said commercial product identifying unit operates to identify, in the case where the plurality of commercial products are detected by said commercial product number checking unit, the commercial products of interest as the commercial products to be returned back to said commercial product casted portion.

20. A check-out system according to claim 13, further comprising:

a commercial product number checking unit for checking the number of commercial products put on said transport path, wherein said commercial product identifying unit operates to utilize the check result provided by said commercial product number checking unit for identifying the commercial products.

21. A check-out system according to claim 13, further comprising:

a storage unit for holding a correspondence table for storing the data relating to the correspondence relationship between the commercial product codes, and characteristic data of the commercial products and an allowable error range of the characteristic data;

a measurement unit for measuring the characteristic data of the commercial product in said commercial product identifying unit;

an operation unit for inputting an operation mode of said check-out system; and a unit for checking the coincidence with respect to the commercial product, wherein said commercial product coincidence checking unit operates to compare, when the operation mode of interest is the first mode, the measured values provided by said measurement unit and the characteristic data in said table with each other to calculate an error and store the calculated values as the allowable error range in said table, and to compare, when the operation mode of interest is the second operation mode, the measured values provided by said measurement unit and the characteristic data in said table with each other to calculate an error and check whether or not the calculated value is within the allowable error range in said table to utilize the checked result for identifying the commercial products.

22. A check-out system according to claim 21, wherein said commercial product coincidence checking unit operates to check, when the operation of interest is the first operation mode, whether or not the commercial product characteristic data corresponding to the commercial product code input to said table is registered, and store, in the case where the commercial product characteristic data is not registered, the calculated error as the allowable error range.

23. A check-out system according to claim 21, wherein said commercial product coincidence checking unit operates to check, when the operation of interest is the first operation mode, whether or not the commercial product characteristic data corresponding to the commercial product code input to said table is registered, and compare, in the case where the commercial product characteristic data is registered, the value of the calculated error and the allowable error range stored with each other, and store, in the case where the value of the calculated error is beyond the allowable error range, the calculated error as the allowable error range.

24. A check-out system according to claim 13, further comprising:

a photographing unit for monitoring the operation of an operator;

a projection unit for projecting the photographing contents provided by said photographing unit;

an abnormality or injustice detecting unit for detecting abnormality or injustice of the operation; and means for outputting, when the abnormality or injustice of the operation is detected, an alarm signal to said projection unit.

* * * * *